(12) United States Patent
Oishi

(10) Patent No.: US 12,541,044 B2
(45) Date of Patent: Feb. 3, 2026

(54) INSPECTION WINDOW FOR DRAIN PAN, AND AIR CONDITIONER

(71) Applicant: Mitsubishi Electric Corporation, Tokyo (JP)

(72) Inventor: Keisuke Oishi, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 238 days.

(21) Appl. No.: 18/259,489

(22) PCT Filed: Mar. 23, 2021

(86) PCT No.: PCT/JP2021/011981
§ 371 (c)(1),
(2) Date: Jun. 27, 2023

(87) PCT Pub. No.: WO2022/201306
PCT Pub. Date: Sep. 29, 2022

(65) Prior Publication Data
US 2024/0053518 A1    Feb. 15, 2024

(51) Int. Cl.
*G02B 5/10* (2006.01)
*F24F 13/22* (2006.01)

(52) U.S. Cl.
CPC .............. *G02B 5/10* (2013.01); *F24F 13/222* (2013.01)

(58) Field of Classification Search
CPC .......... F24F 1/0047; F24F 13/20; F24F 13/22; F24F 13/222; G02B 5/08; G02B 5/10; G02B 5/124
See application file for complete search history.

(56) References Cited

U.S. PATENT DOCUMENTS

2016/0123606 A1\* 5/2016 Hatakeyama ........... F24F 13/20
                                                           62/259.1
2017/0045802 A1    2/2017 Fujii et al.
(Continued)

FOREIGN PATENT DOCUMENTS

EP        2228609 A1 \*  9/2010  ............ F24F 1/0071
JP      H03-053441 U    5/1991
(Continued)

OTHER PUBLICATIONS

Takada, Indoor Unit of Air Conditioner, Aug. 29, 2013, JP 2013167410 A, Whole Document (Year: 2013).\*
(Continued)

*Primary Examiner* — Elizabeth J Martin
*Assistant Examiner* — Adam Dorrel Moore
(74) *Attorney, Agent, or Firm* — Posz Law Group, PLC

(57) ABSTRACT

An inspection window for confirming foreign objects inside a drain pan through a window portion, the inspection window includes: the window portion; a first support portion provided on the window portion; and a reflective portion supported by the first support portion above the window portion through a predetermined gap with respect to the window portion, the reflective portion includes a second surface opposite to a first surface connected to the first support portion, and the reflective portion includes, in the second surface, a first reflective structure that reflects light transmitted through the window portion. The window portion, the first support portion, and the reflective portion are integrally formed of light-transparent material. Thereby, even when the area of the window portion is restricted, visibility of the foreign objects inside the drain pan can be insured, while limiting a displacement in a position of the window portion and the reflective plate.

18 Claims, 16 Drawing Sheets

(56) References Cited

U.S. PATENT DOCUMENTS

2018/0299661 A1    10/2018  Zhu et al.
2019/0295790 A1*    9/2019  Noh ..................... H01H 25/06

FOREIGN PATENT DOCUMENTS

| JP | H04-085301 U |   | 7/1992 |
| JP | H08-122508 A |   | 5/1996 |
| JP | 2007-024454 A |   | 2/2007 |
| JP | 2009-127983 A |   | 6/2009 |
| JP | 2013120034 A | * | 6/2013 |
| JP | 2013167410 A | * | 8/2013 |
| WO | 2015/166688 A1 |   | 11/2015 |

OTHER PUBLICATIONS

Takesako, Indoor Unit for Air Conditioner, 2013-06-172013-08-29, JP 2013120034 A, Whole Document (Year: 2013).*
Office Action mailed Dec. 5, 2023 in corresponding Japanese Patent Application No. 2023-508215 (and English machine translation).
International Search Report of the International Searching Authority mailed Jun. 8, 2021 in corresponding International Application No. PCT/JP2021/011981 (and English translation).
Office Action issued on Dec. 16, 2025, in corresponding Chinese patent application No. 202180094156.9 (and English machine translation).

* cited by examiner

INSPECTION WINDOW FOR DRAIN PAN, AND AIR CONDITIONER

CROSS REFERENCE TO RELATED APPLICATION

This application is a U.S. national stage application of International Application No. PCT/JP2021/011981, filed on Mar. 23, 2021, the contents of which are incorporated herein by reference.

TECHNICAL FIELD

The present invention relates to an inspection window for confirming foreign objects of a drain pan, which is attached to the drain pan included in an indoor unit of an air conditioner. The present invention also relates to an air conditioner that includes an inspection window for confirming foreign objects of a drain pan.

BACKGROUND

A ceiling-mounted air conditioner (for example, a four-way cassette type air conditioner) includes a unit main body that has an air temperature adjustment and air blowing function.

The unit main body is installed so as to hang from a ceiling by suspension bolts provided on beams or the like in a ceiling space. The unit main body includes an indoor heat exchanger and a blower. A drain pan is provided under the indoor heat exchanger of the unit main body so as to catch and collect drain water condensed and formed by the indoor heat exchanger. The drain water that accumulates in the drain pan is discharged to the outside of the unit main body through a discharge outlet in which a drain pump and a drain pipe are installed.

Dust, bacteria or the like in the air enters the drain water and accumulates over time in a bottom portion of the drain pan to become foreign objects. In the "Law Concerning Ensuring Sanitary Environments in Buildings" (commonly referred to as the "Act on Maintenance of Sanitation in Buildings"), inspection once every month or less of a state of adherence of foreign objects of the drain pan of such an indoor unit is determined.

For such an inspection, in a method of detaching the drain pan from a case main body of the indoor unit to confirm the state of contamination of the drain pan, problems of the inspection being complex and needing too much time exists. When detaching the drain pan from the case main body, a problem of the drain water that accumulated in the drain pan dripping and contaminating floor surfaces, table tops or the like that are underneath (vertically underneath) the indoor unit exists.

As a resolution method to such problems, an air conditioning indoor unit is suggested in which a through hole is provided in the drain pan so as to penetrate the drain pan in a plate thickness direction, and a transparent element is fitted in the through hole. A method of grasping the state of contamination of the inside of the drain pan is suggested, which is performed by seeing the foreign objects that adhered to an inner surface of the transparent element in such an air conditioning indoor unit (for example, refer to Patent Document 1).

In the above conventional method, the state of contamination of the inside of the drain pan is grasped by providing a reflective plate right above the transparent element that is a window portion, by having light that enters from the outside to the inside of the drain pan through the transparent element be reflected by the reflective plate, and by visually confirming the reflective plate from the outside of the drain pan.

PATENT DOCUMENT

[Patent Document 1] Japanese Unexamined Patent Application, First Publication No. 2009-127983

In the above conventional method, as an example, a side surface of an intake portion of the drain pump is used as the reflective plate. However, in such a conventional method, for example, in the case where the side surface of the intake portion of the drain pump is used as the reflective plate, the transparent element and the drain pump are assembled to the unit main body as individual parts, so a displacement in a position of the reflective plate with respect to the transparent element easily occurs. Due to dimensional variations that occur when manufacturing the transparent element and the reflective plate as individual elements, the displacement in the position of the reflective plate with respect to the transparent element easily occurs as well.

In the above conventional method, the state of adherence of the foreign objects of the inside of the drain pan is confirmed by detaching a corner panel of a decorative panel attached to the unit main body and seeing the foreign objects that have adhered to the transparent element from an opening of the decorative panel, and the opening is provided in a region of the decorative panel that is covered by the corner panel. However, in the region of the decorative panel that is covered by the corner panel, a vane motor and a sensor are provided, and there are restrictions on a position of the opening that may be formed and an area of the opening. For this reason, a trend in which the through hole of the drain pan or the area of the transparent element attached to the through hole becomes smaller exists.

In the transparent element having such restrictions on the area, when the displacement in the position of the reflective plate with respect to the transparent element occurs, a worker trying to see the foreign objects that have adhered to the inner surface of the transparent element through the through hole of the drain pan is not able to see a part of the reflective plate or the entire reflective plate due to the displacement in the position of the reflective plate, and a problem of a decrease in visibility of the foreign objects exists.

SUMMARY

The present disclosure resolves the above described problems, and the objective thereof is to provide an inspection window and an air conditioner capable of insuring the visibility of the foreign objects of the inside of the drain pan, while limiting the displacement in the position of the window portion and the reflective plate even in a case where the area of the through hole of the drain pan is restricted.

To achieve the above described objective, an inspection window according to the present disclosure includes: a window portion attached to a water storage portion provided in a drain pan inside a housing included in an air conditioner so as to be aligned with a through hole penetrating the water storage portion above the through hole, the water storage portion accumulating drain water generated by an indoor heat exchanger under the indoor heat exchanger; a first support portion provided on the window portion; and a reflective portion supported by the first support portion above a top surface of the window portion, wherein the reflective portion includes a first surface connected to the first support portion, and a second surface opposite to the first surface, the reflective portion includes, in the second surface, a first reflective structure that reflects light transmitted through the window portion toward the through hole, and the first reflective structure is a spherical surface that protrudes upward from the second surface, and the window portion, the first support portion, and the reflective portion are integrally formed of light-transparent material.

In an inspection window of the present disclosure, a window portion, a reflective plate, and a post are continuously and integrally formed, the reflective plate includes a reflective structure in a second surface opposite to a first surface connected to the post, and the reflective structure is made to reflect light transmitted through the window portion. Therefore, even when the area of the inspection window of a drain pan is restricted, it is possible to insure visibility of foreign objects of the window portion attached to a through hole, while limiting a displacement in a position of the window portion and the reflective plate.

DETAILED DESCRIPTION

From hereon, an inspection window and an air conditioner according to the present disclosure are described by referencing the drawings. Components denoted with the same reference symbols are the same or correspond to each other, and this holds true throughout the entirety of the present description. Embodiments of component configurations shown throughout the entirety of the present description are mere examples, and the component configurations are not in any way limited by the embodiments shown in the present description. Particularly, shapes of components are not in any way limited by shapes in the embodiments. There are cases where drawings show a simplified version of actual structures. In drawings, there are cases where the size of each component and/or positional relationships between components differ from the actual structures. Unless otherwise specified, the terms "above", "underneath", "upper side", "lower side", "top surface" and "lower surface" show relative positional relationships of individual parts of a ceiling-mounted air conditioner to be described later, when the air conditioner is attached to a ceiling. Regarding expressions of the positional relationships of the components in the below description, the term "parallel" does not only necessarily refer to the mathematical interpretation of two planes not meeting even if extended to infinitum, but also includes a nearly parallel interpretation where an angle range of 0 to ±5 degrees exists between the planes. In the present description, the term "match" includes a case where both of the components align within a range of 0 to ±1 mm. In the present description, the term "right angle" includes a range of 90 degrees±5 degrees. There are cases where a relationship of sizes of configuration elements in drawings differs from actuality.

First Embodiment

Figure 1:
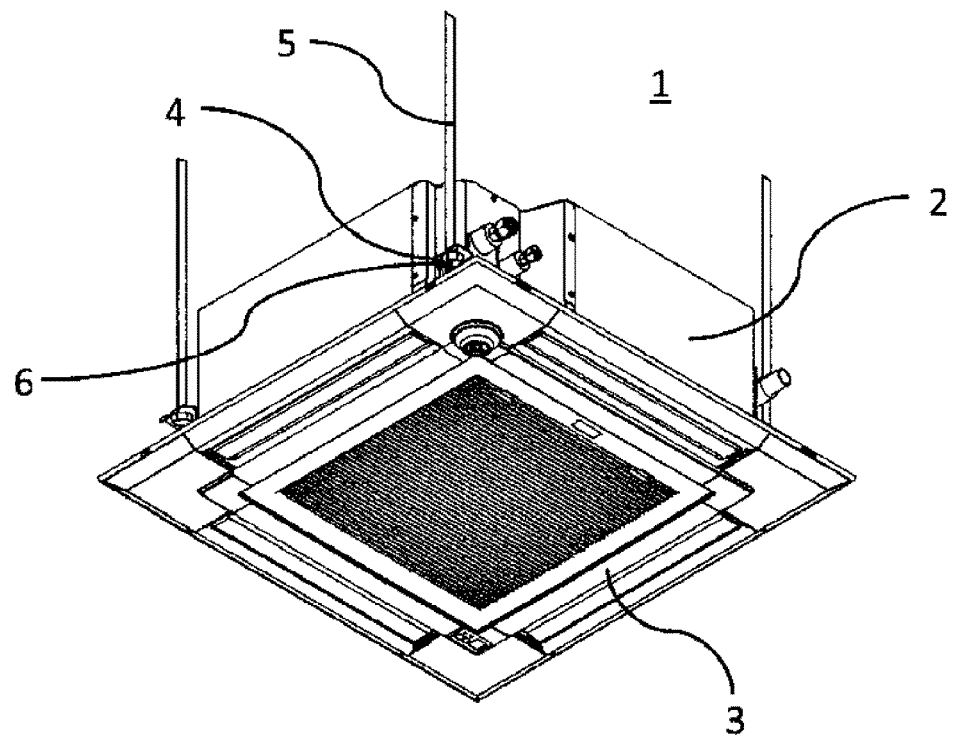
FIG. 1 is a schematic perspective view showing an overall structure of a ceiling-mounted air conditioner in a first embodiment.

FIG. 1 is a perspective view showing an overall structure of a ceiling-mounted air conditioner 1 that is an air conditioner according to a first embodiment. The ceiling-mounted air conditioner 1 according to the present embodiment is installed in a state where a part thereof is embedded in a ceiling.

The ceiling-mounted air conditioner 1 (hereinafter referred to as "indoor unit 1") includes a unit main body 2 having an air circulation unit or the like that is built-in, and a decorative panel 3 detachably attached to the unit main body 2. A hanging hook 4 is provided on each outer circumferential corner portion of the unit main body 2. The unit main body 2 is fixed to a ceiling space by attaching nuts 6 to suspension bolts 5 provided on beams or the like in the ceiling space, after having the suspension bolts 5 pass through the hanging hooks 4.

Figure 2:
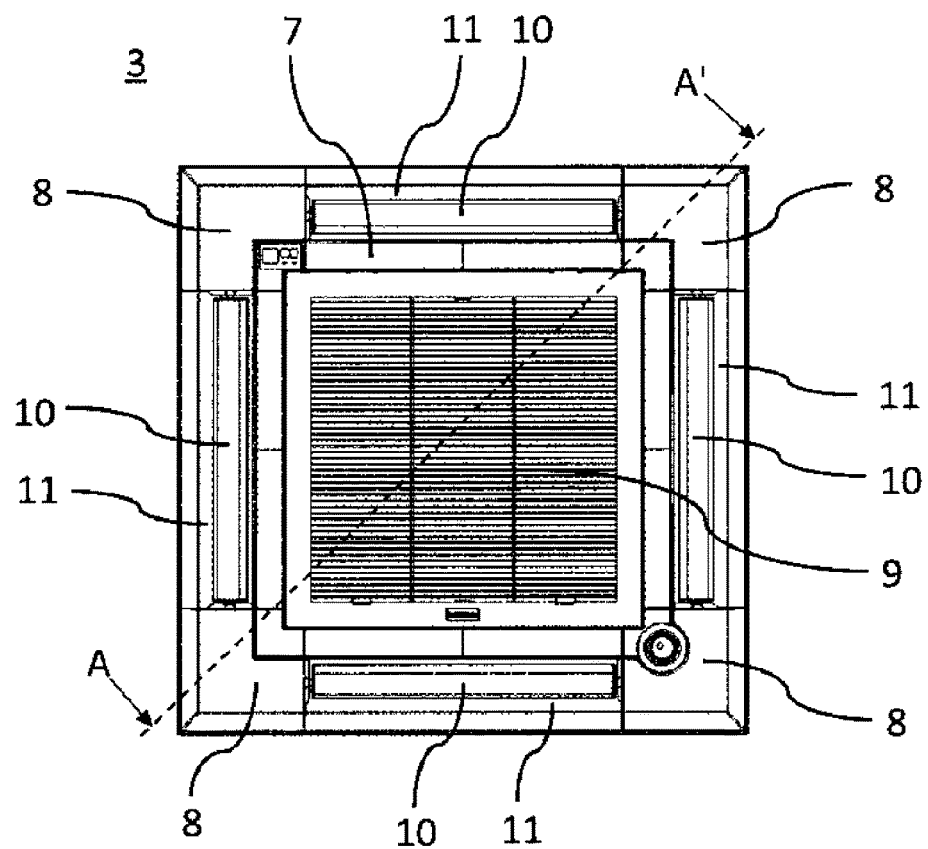
FIG. 2 is a schematic plan view showing a decorative panel of the ceiling-mounted air conditioner in the first embodiment.

FIG. 2 is a plan view of the decorative panel 3 when seen from a room side.

The decorative panel 3, which faces the room side and is an exterior panel of the indoor unit 1, is equipped underneath the unit main body 2.

The decorative panel 3 includes a decorative panel main body 7 for covering the ceiling holes, corner panels 8 that are detachably provided on four corners of the decorative panel main body 7, an intake grille 9 configuring an intake that is provided in a central portion of the decorative panel main body 7 and that inhales air of the room into the unit main body 2, and on the outside of the intake grille 9, an outlet 11 that is provided along each side of the decorative panel main body 7 and includes an air direction adjustment vane 10.

Figure 3:
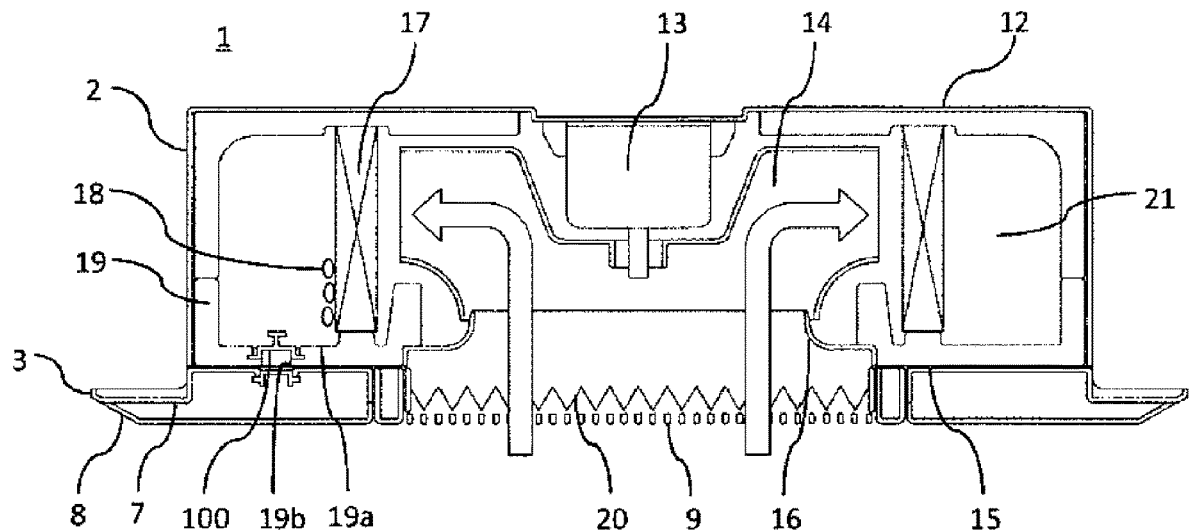
FIG. 3 is a schematic vertical cross-sectional view of the ceiling-mounted air conditioner in the first embodiment viewed from a straight line A-A'.

FIG. 3 is a schematic cross-sectional view of the indoor unit 1 viewed from a cross-sectional line A-A' of FIG. 2.

The unit main body 2 includes, inside of a housing 12, a fan motor 13 and a fan 14. When the unit main body 2 is installed in an area of the ceiling space, the unit main body 2 includes a bell-mouth 16 that becomes the intake of air on a room side surface 15.

The fan motor 13 is attached to a top board of the housing 12. The fan 14 is attached to the output shaft of fan motor 13, and the fan 14 is driven by the fan motor 13. Around the fan 14, an indoor heat exchanger 17 is disposed so as to surround the fan 14, and a drain pan 19 is provided underneath the indoor heat exchanger 17 and receives drain water 18 that is condensed and produced by the indoor heat exchanger 17.

The drain pan 19 is accommodated in the housing 12 and is installed on the top of the decorative panel 3. A water storage bottom portion 19a of the drain pan 19 is provided with a through hole 19b penetrating therethrough in a thickness direction (up down direction). An inspection window 100 formed of light-transparent material is attached to the water storage bottom portion 19a of the drain pan 19 so as to cover the through hole 19b, and the inspection window 100 closes the through hole 19b.

The decorative panel 3 is detachably attached to the unit main body 2 so as to cover and hide the room side surface 15 of the unit main body 2 and is installed in the room where an object of air conditioning exists. The decorative panel 3 includes the intake of the intake grille 9 in a location corresponding to the bell-mouth 16 of the unit main body 2. The intake grille 9 includes a filter 20 that removes dust or the like from the air.

A flow of air in the indoor unit 1 of the above configuration is described using FIG. 3.

When the fan 14 operates, the air in the space of the object of air conditioning is inhaled into the unit main body 2 through the intake of the intake grille 9, the filter 20, and the intake of the bell-mouth 16. The air of the space of the object of air conditioning inhaled into the unit main body 2 undergoes heat exchange with a refrigerant flowing in the indoor heat exchanger 17, thereafter passes through an air path 21, the air direction thereof is adjusted by the air direction adjustment vanes 10 (not shown), and the air returns to the space of the object of air conditioning from the outlets 11 (not shown).

Figure 4:
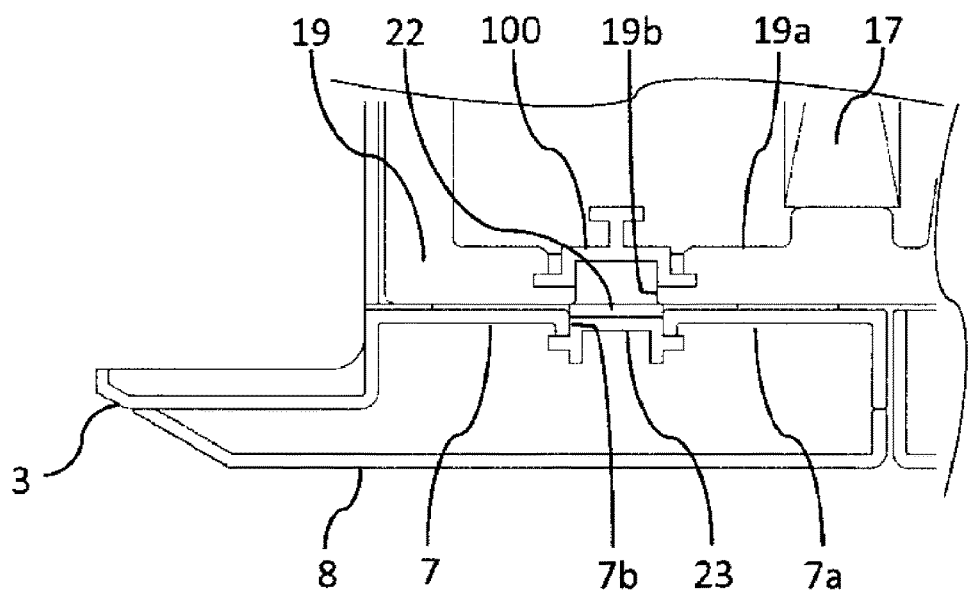
FIG. 4 is a schematic cross-sectional view showing an enlarged part of surroundings of an inspection window in the first embodiment.

FIG. 4 is a schematic cross-sectional view showing an enlarged part of surroundings of the inspection window 100 of FIG. 3. In a corner portion region 7a of the decorative panel 3 that is covered with the corner panel 8, a visual inspection hole 7b that penetrates the decorative panel main body 7 in the up down direction, in other words, a thickness direction of the decorative panel main body 7 is formed. The visual inspection hole 7b is formed in a location that is aligned with the through hole 19b of the drain pan 19 in the vertical direction when the decorative panel 3 is attached to the housing 12. In other words, when the decorative panel 3 is attached to the housing 12, the visual inspection hole 7b is located directly below the through hole 19b of the drain pan 19. Therefore, it is possible for an inspector to confirm the inspection window 100 from the room side, through the visual inspection hole 7b and the through hole 19b.

To the visual inspection hole 7b of the decorative panel main body 7, a cover 23 that includes a heat insulator 22 is detachably attached from the room side. During normal operation of the indoor unit 1, the corner panel 8 is detachably attached to the decorative panel main body 7 so as to cover the cover 23. Since the cover 23 is covered by the corner panel 8, the cover 23 is not visible from the room side during normal operation of the indoor unit 1, and thus the design of the indoor unit 1 is enhanced. When inspecting the indoor unit 1, by the inspector removing the corner panel 8 and the cover 23, the inspector can confirm the inspection window 100 from the visual inspection hole 7b.

In the water storage bottom portion 19a of the drain pan 19, foreign objects such as dust mixed in the drain water 18 from the indoor heat exchanger 17 are deposited. Foreign objects such as dust mixed in the drain water 18 are also deposited on a surface of the inspection window 100 installed in the water storage bottom portion 19a. The inspector can confirm the foreign objects by visually inspecting the inspection window 100 from the outside of the indoor unit 1 through the visual inspection hole 7b and the through hole 19b.

Although the cross-sectional line A-A' in FIG. 2 is provided in a location separated a few centimeters from a diagonal line of the decorative panel 3, the location the cross-sectional line A-A' is provided in is not limited to such a location.

Figure 5:
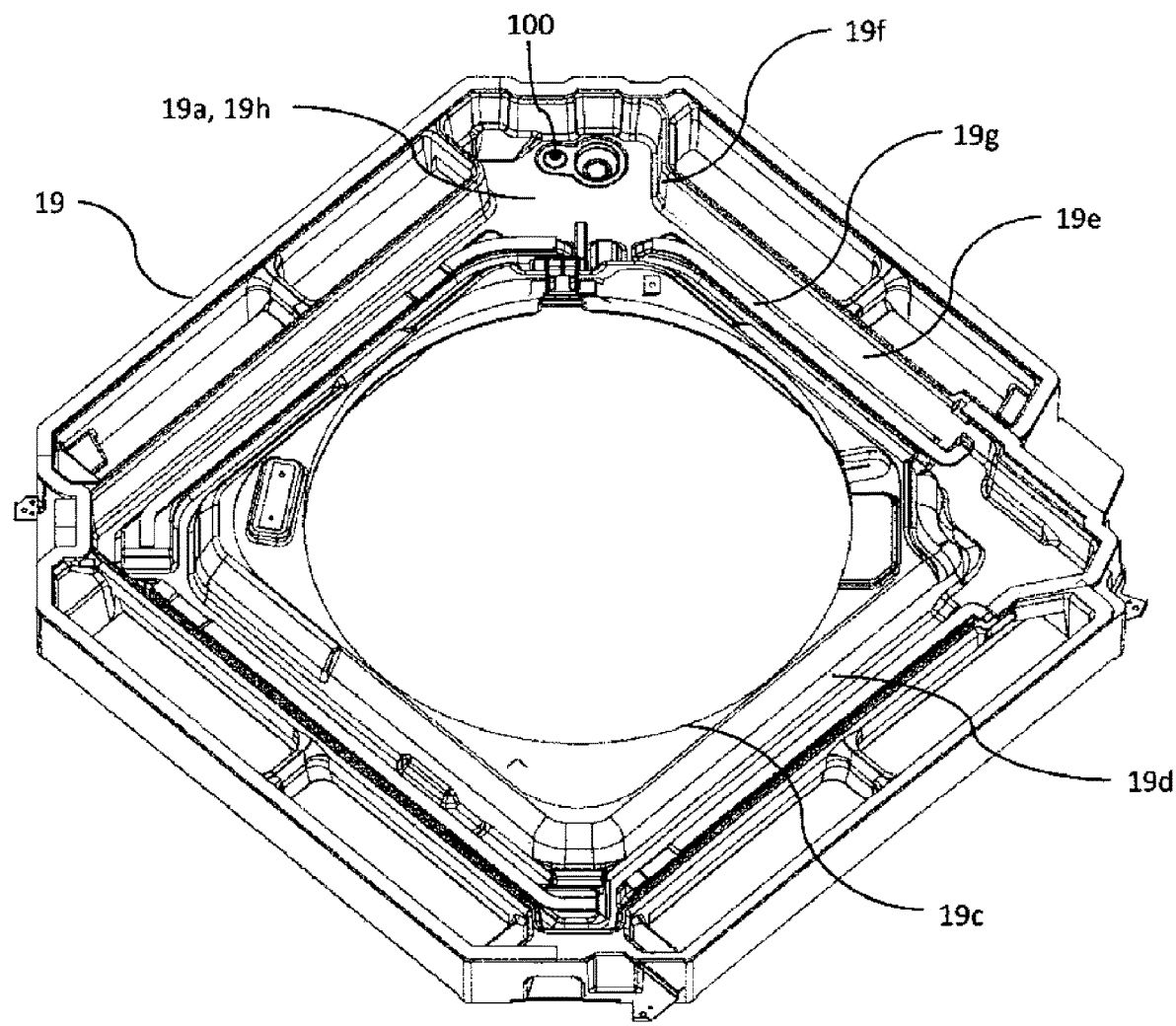
FIG. 5 is a schematic perspective view of a drain pan in the first embodiment.

FIG. 5 is a schematic perspective view of the drain pan 19 seen from above. The drain pan 19 is attached to the inside of the housing 12 of the indoor unit 1. The drain pan 19 includes an opening 19c to dispose the bell-mouth 16 in the center, includes a water storage wall 19d that surrounds the opening 19c, and includes, on the outside of the water storage wall 19d, a water storage wall 19e that surrounds to water storage wall 19d. The drain pan 19 includes the water storage bottom portion 19a between the water storage wall 19d and the water storage wall 19e. A water storage portion 19f is formed of the water storage wall 19d, the water storage wall 19e and the water storage bottom portion 19a. A top surface 19h of the water storage bottom portion 19a corresponds to a bottom surface of the water storage portion 19f. A heat exchanger mounting table 19g, on which the indoor heat exchanger 17 is placed, is formed on the top of the water storage bottom portion 19a.

Figure 6:
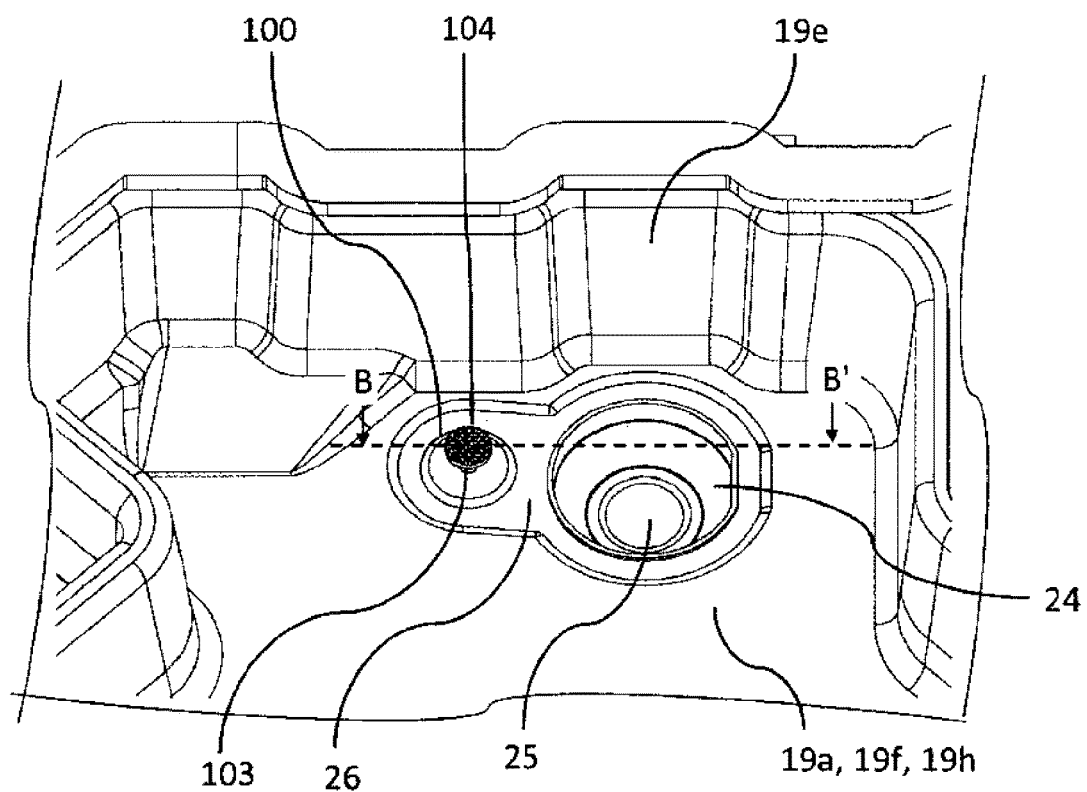
FIG. 6 is a schematic perspective view of surroundings of the inspection window of the drain pan in the first embodiment.
Figure 7:
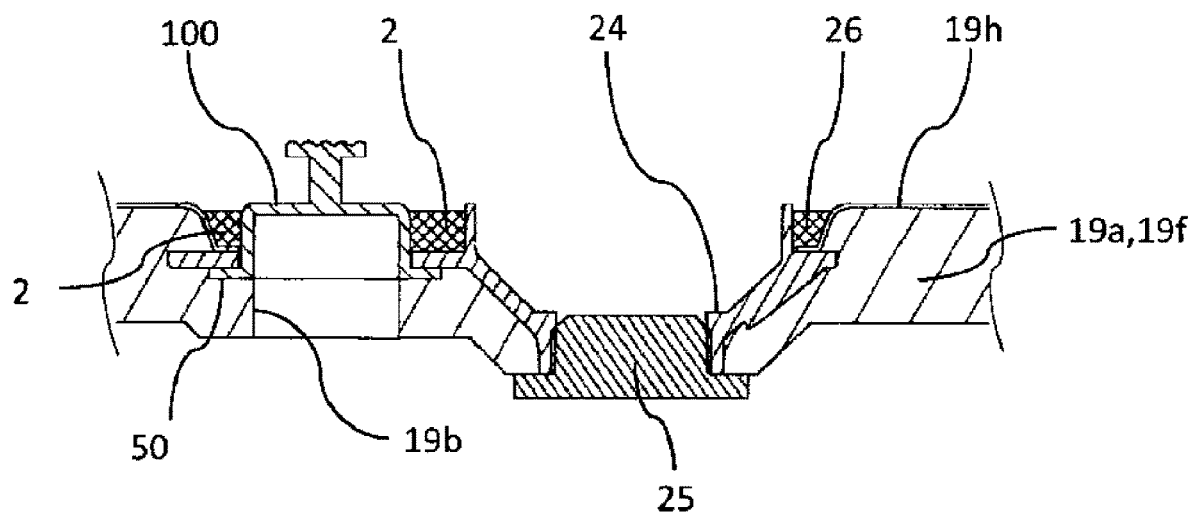
FIG. 7 is a schematic vertical cross-sectional view of the surroundings of the inspection window of the drain pan in the first embodiment viewed from a straight line B-B'.

FIG. 6 is a schematic perspective view showing an enlarged portion of the water storage portion 19f of FIG. 5. FIG. 7 is a schematic cross-sectional view showing cross-sections of the water storage bottom portion 19a, the inspection window 100 and a drain 24 viewed from a cross-sectional line B-B' passing through the center of a reflective plate 104 of the inspection window 100, the center of a post 103, and the drain 24 in FIG. 6.

In the water storage bottom portion 19a of the drain pan 19, the drain 24 that penetrates therethrough in a thickness direction (the up down direction) is provided. A water plug 25 is detachably attached to the drain 24 from the room side. Surroundings of the drain 24 are filled with a sealant 26 and are water stop finished. In a state where the water plug 25 is attached to the drain 24, the drain water 18 from the indoor heat exchanger 17 is stored in the water storage portion 19f of the drain pan 19. When the water plug 25 is removed from the drain 24, the drain water 18 (not shown) stored in the drain pan 19 is drained to the outside of the indoor unit 1 through the drain 24.

The drain pan 19 includes, in the bottom surface 19h of the water storage portion 19f, an attachment surface 50 that is a step lower than the bottom surface 19h and that is parallel to the bottom surface 19h. In the attachment surface 50, the through hole 19b having a cylindrical shape is formed so as to penetrate the drain pan 19 in the up down direction, in other words, in the thickness direction of the drain pan 19. The directions in which the attachment surface 50 and the through hole 19b are formed are orthogonal. The through hole 19b is formed in the vicinity of the drain 24 and apart from the drain 24. The inspection window 100 formed of light-transparent material is attached to the attachment surface 50 so as to cover the through hole 19b, thereby closing the through hole 19b.

As with the drain 24, surroundings of the inspection window 100 are filled with the sealant 26 and are water stop finished.

Next, the inspection window 100 installed in the drain pan 19 is described.

Figure 8:
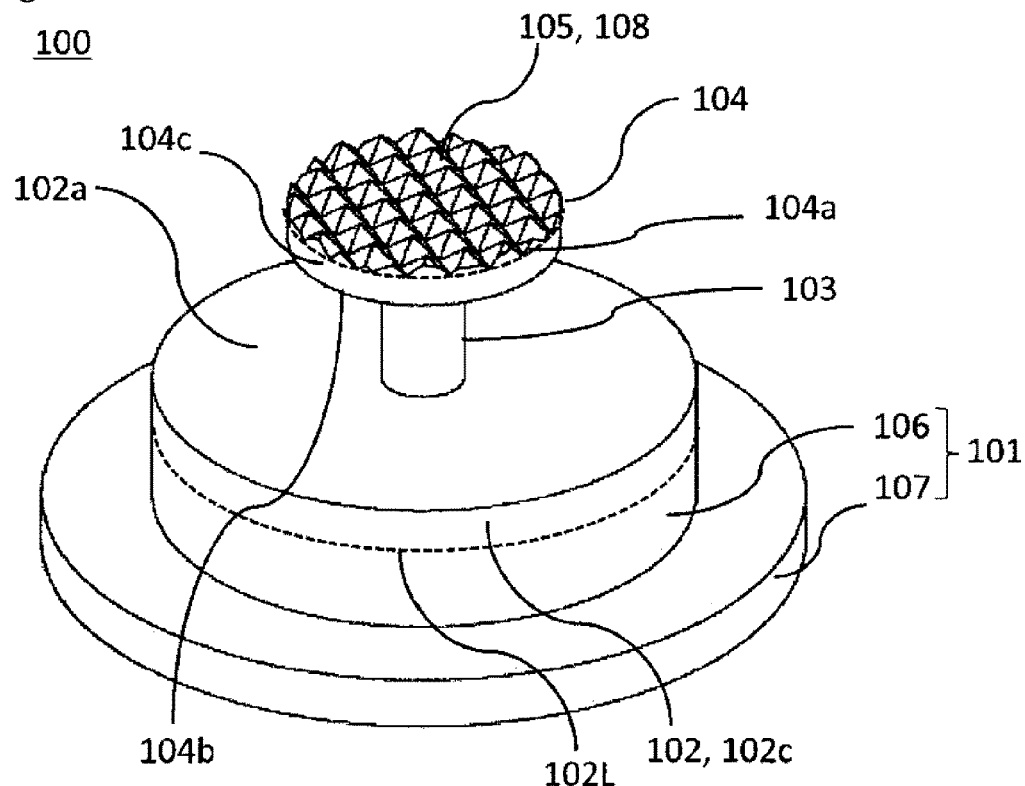
FIG. 8 is a schematic perspective view showing the inspection window in the first embodiment.

FIG. 8 is a schematic perspective view showing the inspection window 100 in the present embodiment.

Figure 9:
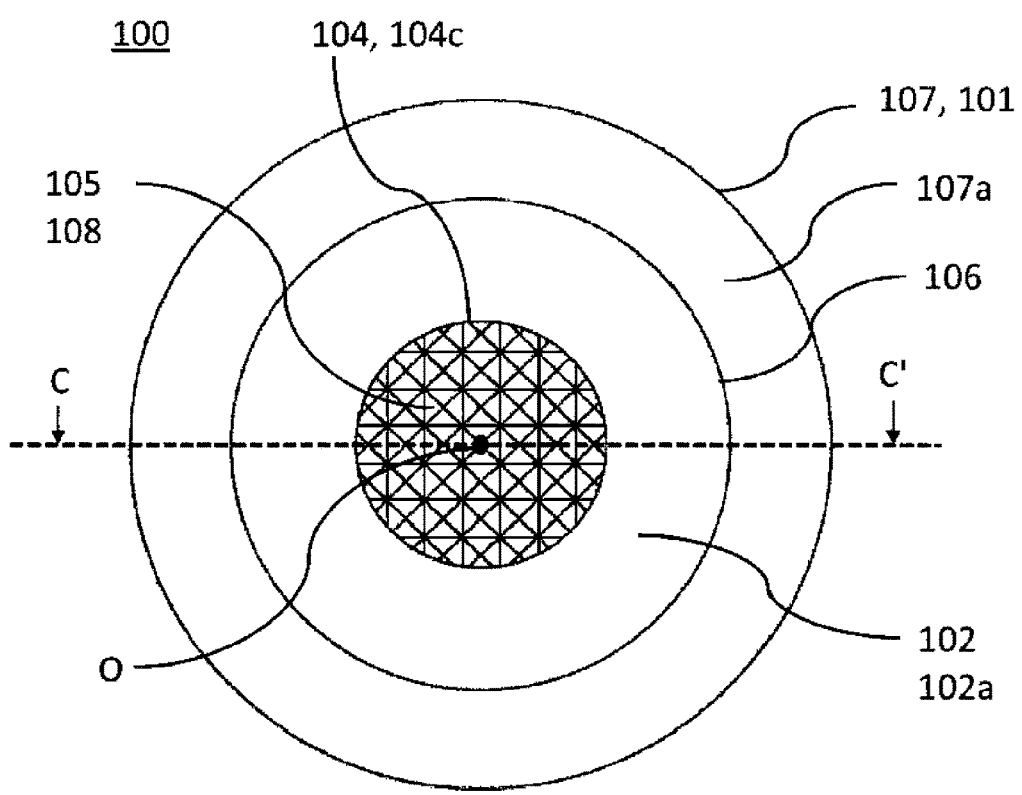
FIG. 9 is a schematic top view showing the inspection window in the first embodiment.

FIG. 9 is schematic top view showing the inspection window 100 in the present embodiment.

Figure 10:
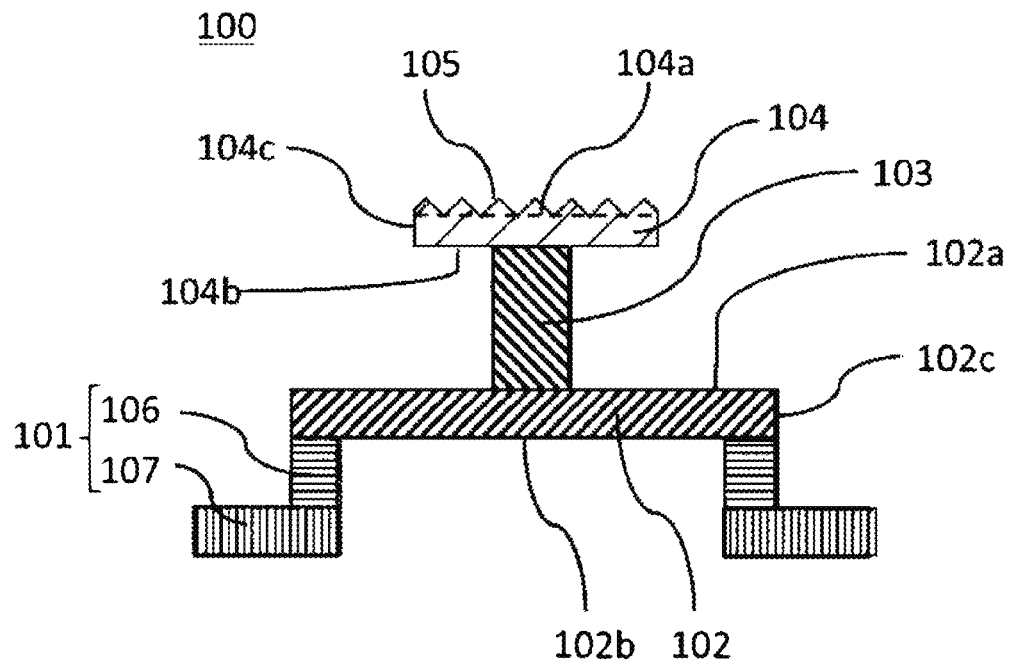
FIG. 10 is a schematic vertical cross-sectional view of the inspection window in the first embodiment viewed from a straight line C-C'.

FIG. 10 is a schematic cross-sectional view of the inspection window 100 in the present embodiment viewed from a cross-sectional line C-C' of FIG. 9. As shown in FIG. 9, the cross-sectional line C-C' is a straight line that passes through the center O of a reflective plate top surface 104a.

The inspection window 100 of the present embodiment is described. As shown in FIG. 8, the inspection window 100 includes an attachment portion 101 attached and fixed to the drain pan 19 (not shown) so as to cover the through hole 19b (not shown) of the drain pan 19, a window portion 102 fixed to the drain pan 19 by the attachment portion 101, a cylindrical post 103 that is a first support portion, in which one end of two ends thereof is connected to a top surface (window portion top surface 102a) of the window portion 102, and that extends vertically with respect to the window portion top surface 102a, and the reflective plate 104 that is a reflective portion, that is connected to the other end of the two ends of the post 103, and that is supported by the post 103 above the window portion top surface 102a.

The reflective plate 104 has a circular plate shape. The reflective plate 104 is configured of a reflective plate lower surface 104b that is a first surface and to which a top end of the post 103 is connected, the reflective plate top surface 104a that is a second surface and that is above the reflective plate lower surface 104b, and a reflective plate side surface 104c that is between the reflective plate top surface 104a and the reflective plate lower surface 104b. As shown in FIG. 10, the reflective plate top surface 104a is a flat surface, shown by dashed lines. The reflective plate top surface 104a and the reflective plate lower surface 104b are parallel. The reflective plate 104 is supported by the post 103 on the window portion top surface 102a such that the reflective plate lower surface 104b is parallel to the window portion top surface 102a. As shown in FIG. 8, the area in the horizontal direction of the post 103 is smaller than the area of the window portion top surface 102a.

The reflective plate 104 includes a reflective structure 105 in the reflective plate top surface 104a that is the second surface. A reflective surface 108 that reflects at least part of light that has passed through the through hole 19b is formed of the reflective structure 105 and a surface of the reflective plate top surface 104a not covered by the reflective structure 105. In a case where the entire reflective plate top surface 104a is covered by the reflective structure 105, the reflective surface 108 is formed of the reflective structure 105.

The attachment portion 101 is formed of a first attachment portion 107 and a second attachment portion 106.

The window portion 102 has a shape of a circular plate having a constant thickness, is configured of the window portion top surface 102a that is a top surface, a window portion lower surface 102b that is a lower surface, and a window portion side surface 102c that is a side surface, and covers the entire through hole 19b of the drain pan 19. The window portion 102 is made to transmit part of light that has passed through the through hole 19b toward the reflective plate 104. The window portion top surface 102a is orthogonal to a direction of formation of the through hole 19b.

As shown in FIG. 8, the second attachment portion 106 is provided to be connected to the window portion 102 at a dashed line 102L, along an outer edge of the window portion 102 and to be connected to the first attachment portion 107. The second attachment portion 106 has a circular tube shape having a cylindrical space on the inside thereof.

The first attachment portion 107 has a shape radially extending outwards from the lower end of the second attachment portion 106 and having a constant thickness.

In FIG. 10, although the second attachment portion 106, the first attachment portion 107, the window portion 102, the post 103, and the reflective plate 104 are separated using solid lines to describe each structure thereof, the second attachment portion 106, the first attachment portion 107, the window portion 102, the post 103, and the reflective plate 104 are integrally formed of a light-transparent resin.

A manufacturing method of the inspection window 100 is described.

Figure 11:
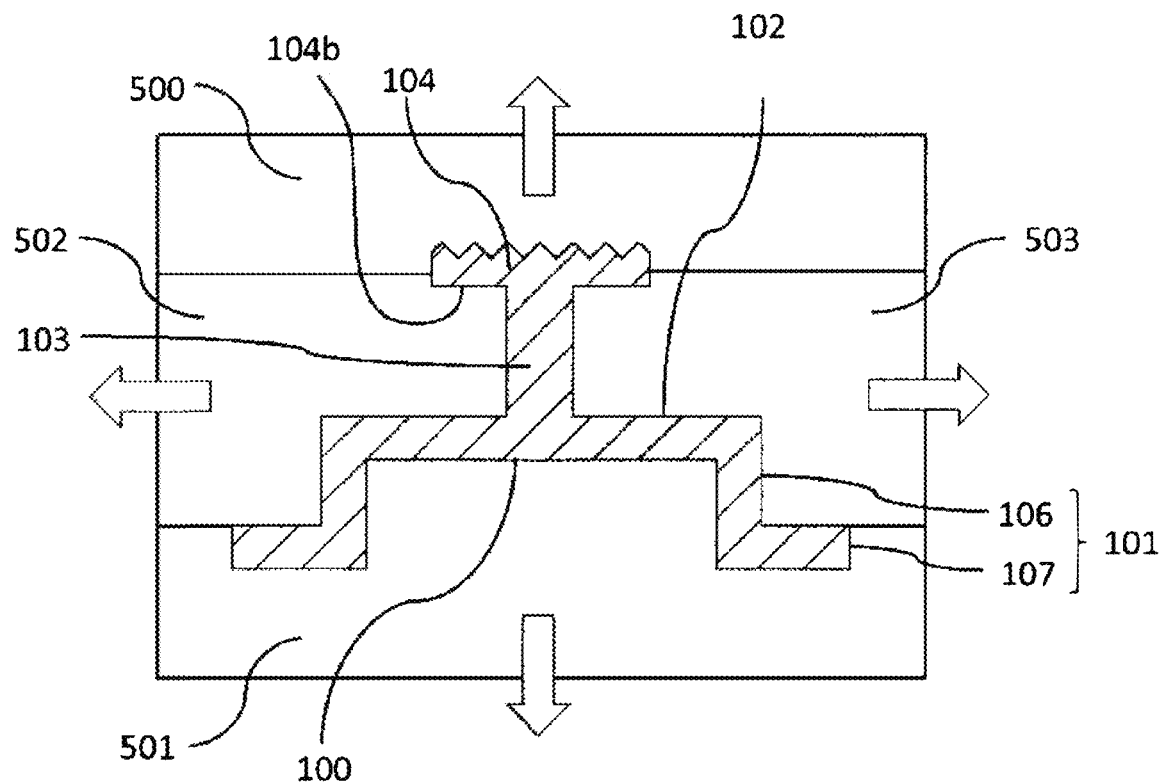
FIG. 11 is a schematic cross-sectional view of the inspection window used in the first embodiment, and a mold used to form the inspection window.

FIG. 11 is a cross-sectional view of a mold to be used in the formation of the inspection window 100. By making the reflective plate lower surface 104b, the window portion top surface 102a, and a top surface 107a of the first attachment portion 107 be parallel to one another, a mold can be formed of a cavity 500, a first slide 502, a second slide 503 and a core 501, and the inspection window 100 can be integrally molded. Although in FIG. 11, the cavity 500 is on a top side of the inspection window 100, and the core 501 is on a lower side of the inspection window 100, the reverse is also possible.

The attachment portion 101, the window portion 102, the post 103, and the reflective plate 104 are formed continuously and integrally by resin molding. In the present embodiment, the inspection window 100 is molded using injection molding, with transparent resins such as polymethyl methacrylate, polyethylene terephthalate, polycarbonate, epoxy, and polyarylate as materials.

Figure 12:
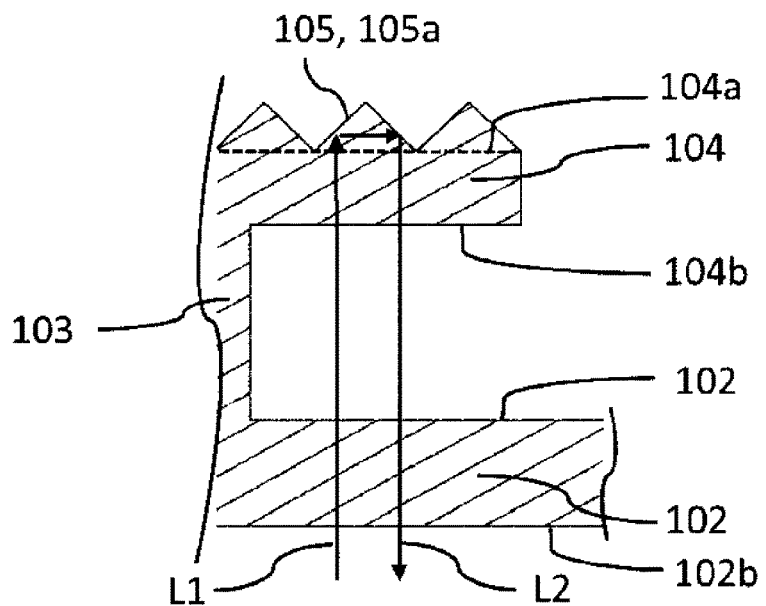
FIG. 12 is a schematic optical path diagram showing the effects of the inspection window according to the first embodiment.

FIG. 12 is an optical path diagram showing the effects of the inspection window 100 according to the first embodiment. The functions of the inspection window 100 are described while referring to the light paths shown in FIG. 12. FIG. 12 is a schematic cross-sectional view of the inspection window 100 attached to the drain pan 19. As with FIG. 10, FIG. 12 is a diagram partially showing the cross-section of the inspection window 100 viewed from the cross-sectional line C-C' passing through the inside of the post 103 of the inspection window 100. Although not shown in FIG. 12, when the drain water that accumulates in the drain pan 19 is at the maximum water surface level, the top end of the inspection window 100, in other words, the reflective structure 105 is below the water surface of the drain water. Since the reflective structure 105 is below the maximum water surface level of the drain water, the width of the inspection window 100 in the up down direction is limited. Therefore, the reflective plate 104 of the inspection window 100 is limited from contacting surrounding equipment.

In FIG. 12, the passing direction of light that has passed through the through hole 19b (not shown) vertically upwards from underneath the drain pan 19 (now shown) is shown by arrows.

Part of the light that has passed through the through hole 19b of the drain pan 19 from the room enters the window portion lower surface 102b that is a first surface of the window portion 102. Since the window portion 102 and the reflective plate 104 are manufactured from light-transparent material, part (light L1) of the incident light from the through hole 19b penetrates the window portion 102 and the reflective plate 104 and reaches a surface (the reflective surface 108) of the reflective structure 105 provided on the reflective plate top surface 104a. The reflective structure 105 includes at least one quadrangular pyramid 105a that protrudes upwards. By providing the reflective structure 105 such a quadrangular pyramid 105a in the reflective plate 104, part of the light that has passed through the through hole 19b of the drain pan 19 and reached the reflective structure 105 of the reflective plate 104 is reflected by surfaces of which the quadrangular pyramid 105a is configured. Reflected light L2 reflected by a plurality of surfaces of the quadrangular pyramid 105a passes through the through hole 19b in the final passing direction opposite to the original direction of the incident light and returns into the room.

The window portion top surface 102a has a height approximately equal to that of the top surface 19h (not shown) of the water storage bottom portion 19a (not shown) and is horizontal, when the inspection window 100 is attached to the drain pan 19. Due to such a configuration, in a state where the foreign objects from the drain water are deposited in the water storage bottom portion 19a, foreign objects from the drain water are also deposited on the window portion top surface 102a. At this time, the incident light L1 is obstructed by the foreign objects of the window portion top surface 102a, and compared to a state where no foreign objects are adhered to the window portion top surface 102a, the strength of the reflected light L2 passing through the through hole 19b and returning into the room is weakened. Due to such an arrangement, the inspector can visually confirm the state of the foreign objects of the window portion top surface 102a from the outside of the indoor unit 1 by seeing the strength of the reflected light L2. In other words, the inspector can grasp the state of adherence of the foreign objects to the drain pan 19 by seeing the strength of the reflected light L2. From the arrangement above, it is possible to determine whether or not it is time to clean the drain pan 19 without the need for the inspector to remove the drain pan 19 from the housing 12 and to confirm the inside of the drain pan 19.

In the present embodiment, although the reflective structure 105 has at least one quadrangular pyramid 105a, the reflective structure 105 is not limited thereto.

Figure 13:
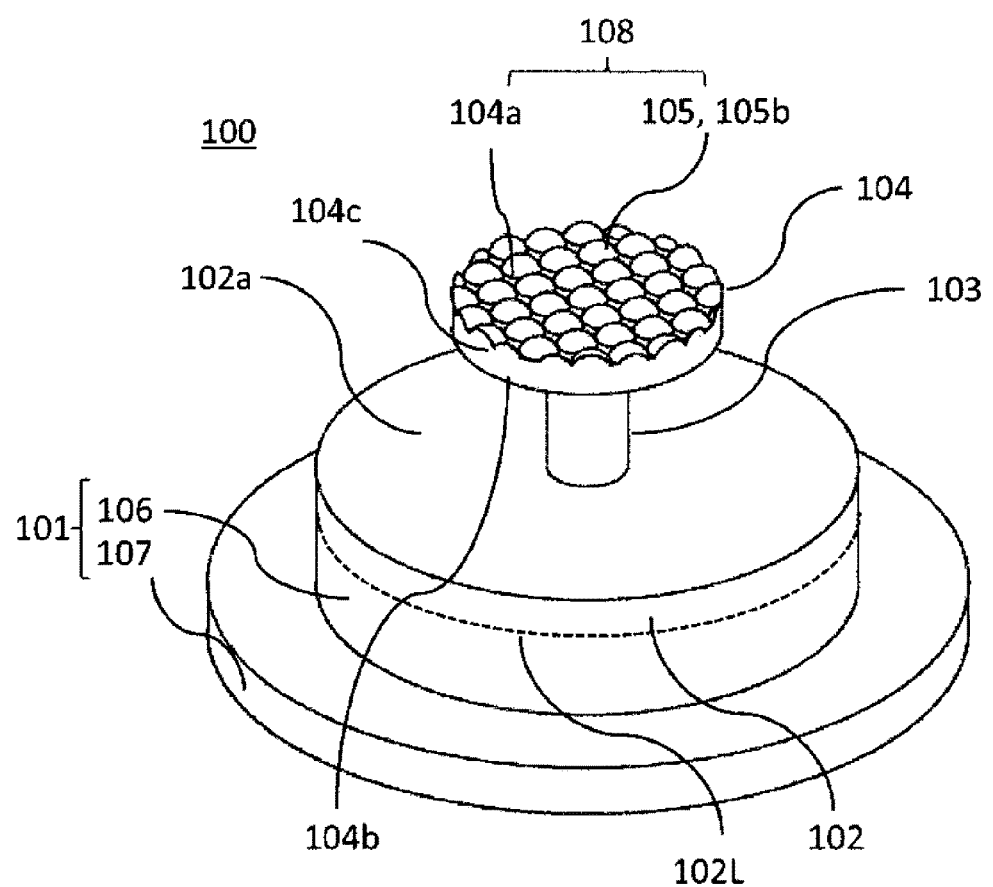
FIG. 13 is a schematic perspective view of the inspection window used in the first embodiment.

As shown in FIG. 13, in the inspection window 100, as the reflective structure 105, at least one spherical surface 105b that protrudes upwards may be formed on the reflective plate top surface 104a in place of the quadrangular pyramid 105a. In other words, as the reflective structure 105, the inspection window 100 may have at least one spherical surface 105b that protrudes upwards on the reflective plate top surface 104a.

Figure 14:
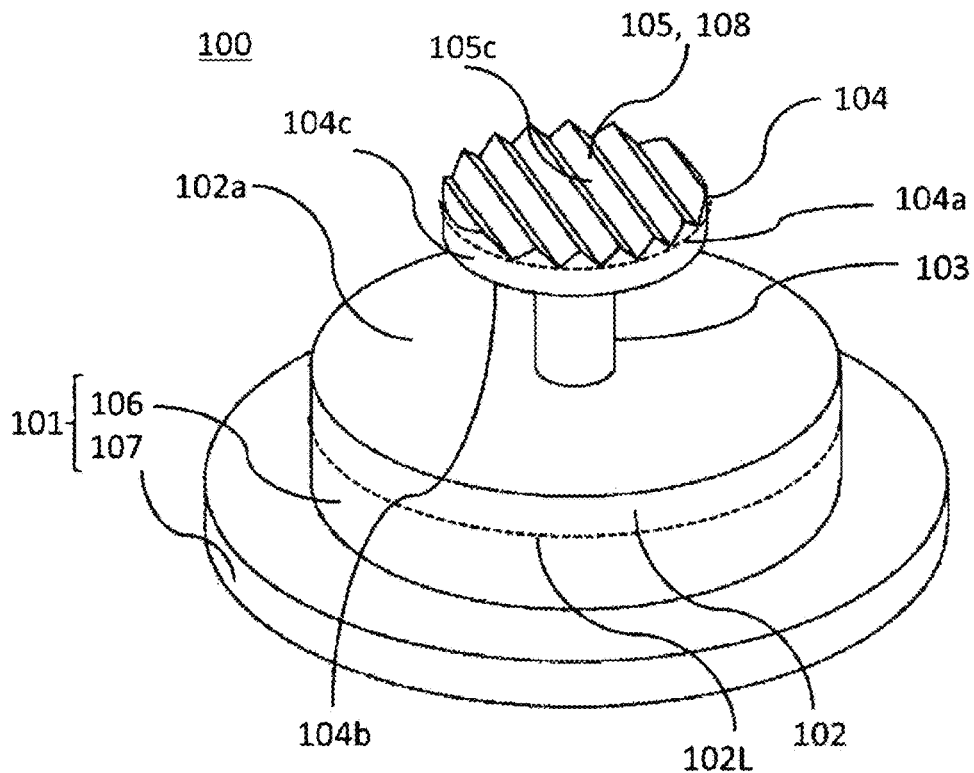
FIG. 14 is a schematic perspective view of the inspection window used in the first embodiment.

As shown in FIG. 14, in the inspection window 100, as the reflective structure 105, at least one apex portion 105c of an apex cross-section (inverse V shape) that protrudes upwards on a vertical cross-section that intersects a straight line formed by two surfaces, the apex portion 105c having an apex shaped as the straight line, may be formed on the reflective plate top surface 104a in place of the quadrangular pyramid 105a. In other words, as the reflective structure 105, the inspection window 100 may have at least one apex portion 105c that protrudes upwards on the reflective plate top surface 104a.

Figure 15:
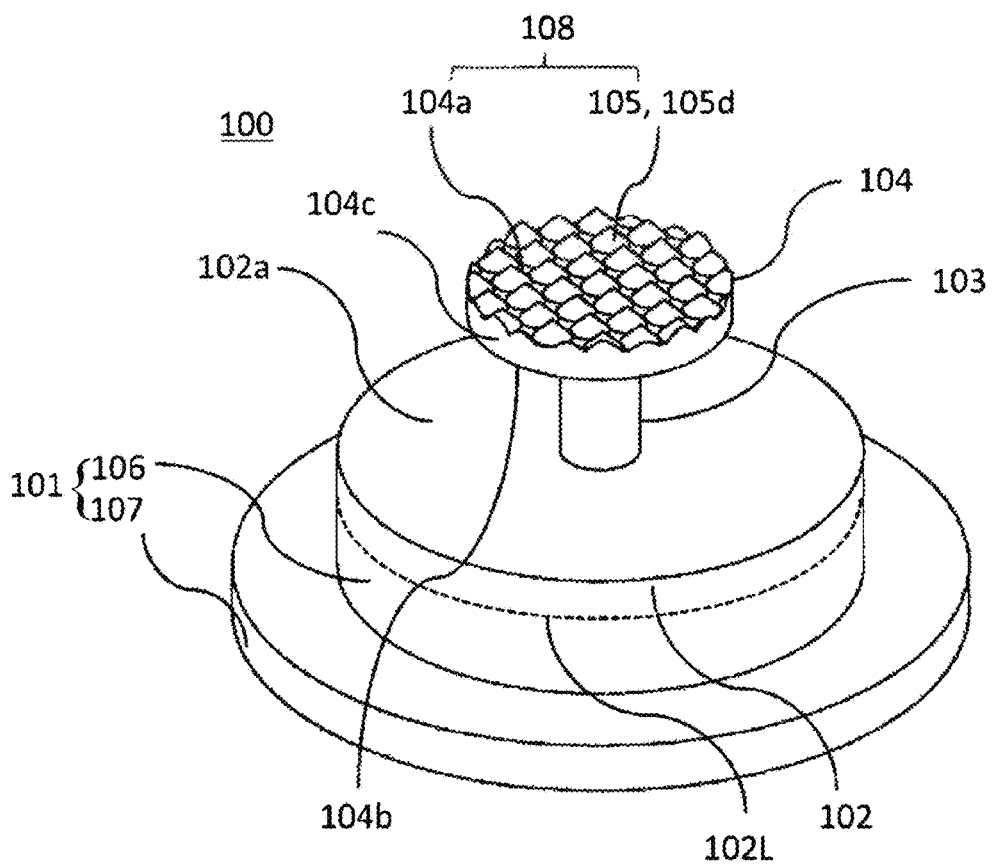
FIG. 15 is a schematic perspective view of the inspection window used in the first embodiment.

As shown in FIG. 15, in the inspection window 100, as the reflective structure 105, at least one cone 105d that protrudes upwards may be formed on the reflective plate top surface 104a in place of the quadrangular pyramid 105a. In other words, as the reflective structure 105, the inspection window 100 may have at least one cone 105d that protrudes upwards on the reflective plate top surface 104a.

Figure 16:
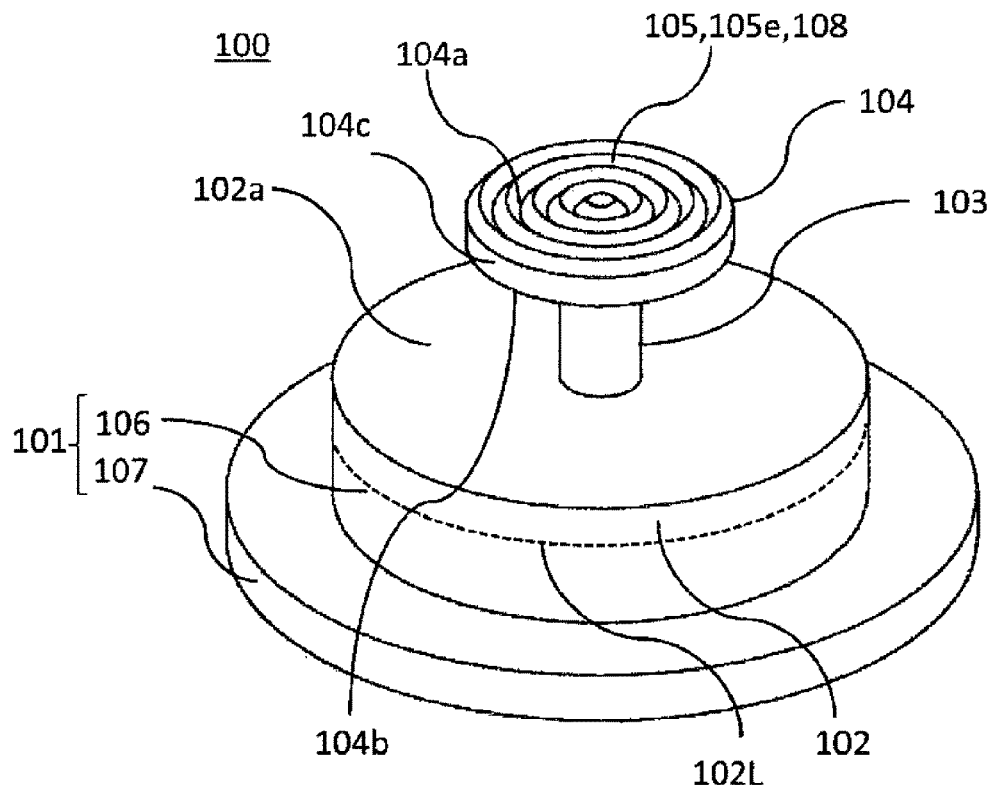
FIG. 16 is a schematic perspective view of the inspection window used in the first embodiment.

As shown in FIG. 16, in the inspection window 100, as the reflective structure 105, at least one apex portion 105e of an apex-cross section (inverse V shape) that protrudes upwards, is provided on a circular line concentric with the center of the reflective plate top surface 104a, and is adjacent to another, may be formed on the reflective plate top surface 104a in place of the quadrangular pyramid 105a. In other words, as the reflective structure 105, the inspection window 100 may have at least one apex portion 105e that protrudes upwards on the reflective plate top surface 104a.

In the above reflective structure 105, compared to a case where the reflective structure 105 is not formed on the reflective plate top surface 104a, the surface area of the reflective surface 108 increases, so reflecting light that has entered from the through hole by the reflective plate 104 becomes easier.

Figure 17:
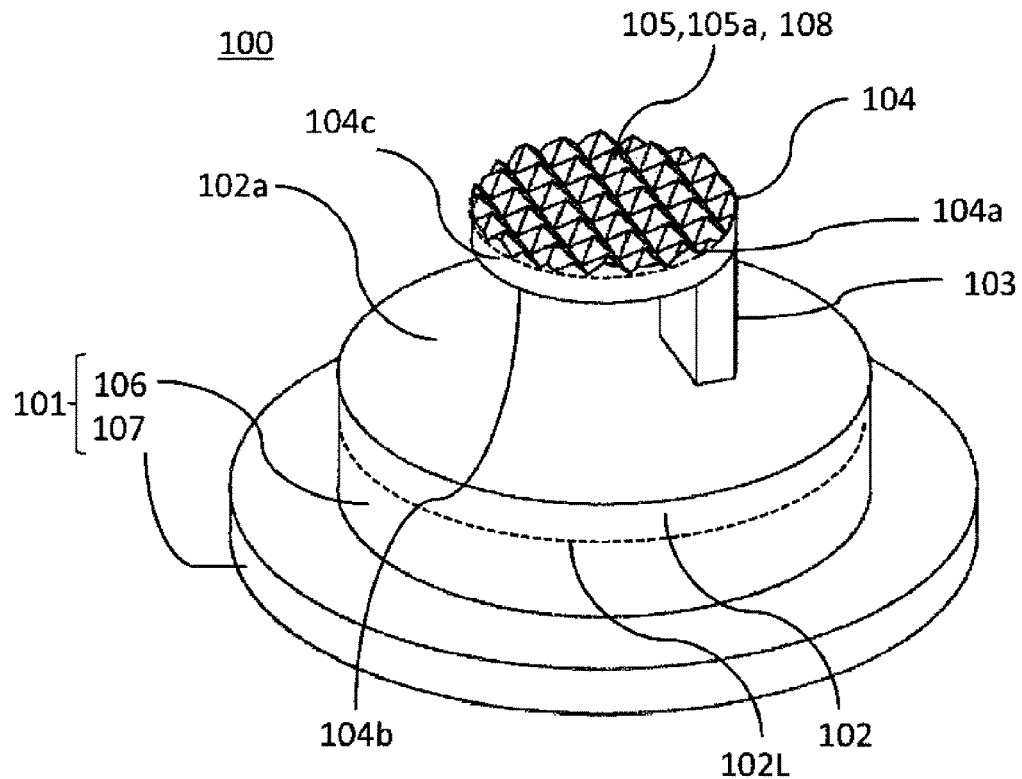
FIG. 17 is a schematic perspective view of the inspection window used in the first embodiment.

In the present embodiment, although a configuration where the post 103 is disposed in a straight line that connects the center of the window portion top surface 102a to the opening center of the through hole 19b (not shown) is described, the configuration is not limited thereto. The post 103 need not be in the center of the window portion top surface 102a or in the center of the reflective plate lower surface 104b of the reflective plate 104. As an example, as in FIG. 17, the post 103 may be provided so as to contact the reflective plate lower surface 104b and the window portion top surface 102a, along an edge of the reflective plate 104. As in FIG. 17, the post 103 does not have a cylindrical shape, but may have a prismatic shape. In such a configuration, the foreign objects from the drain water adhere to the center of the window portion top surface 102a, so it becomes easier for a user to visually confirm the foreign objects of the window portion top surface 102a.

Although the shape of the post 103 in FIGS. 8, 13, 14, 15 and 16 is cylindrical, the shape thereof is not limited thereto. As an example, the post 103 may be a rectangular parallelepiped as in FIG. 17.

Figure 18:
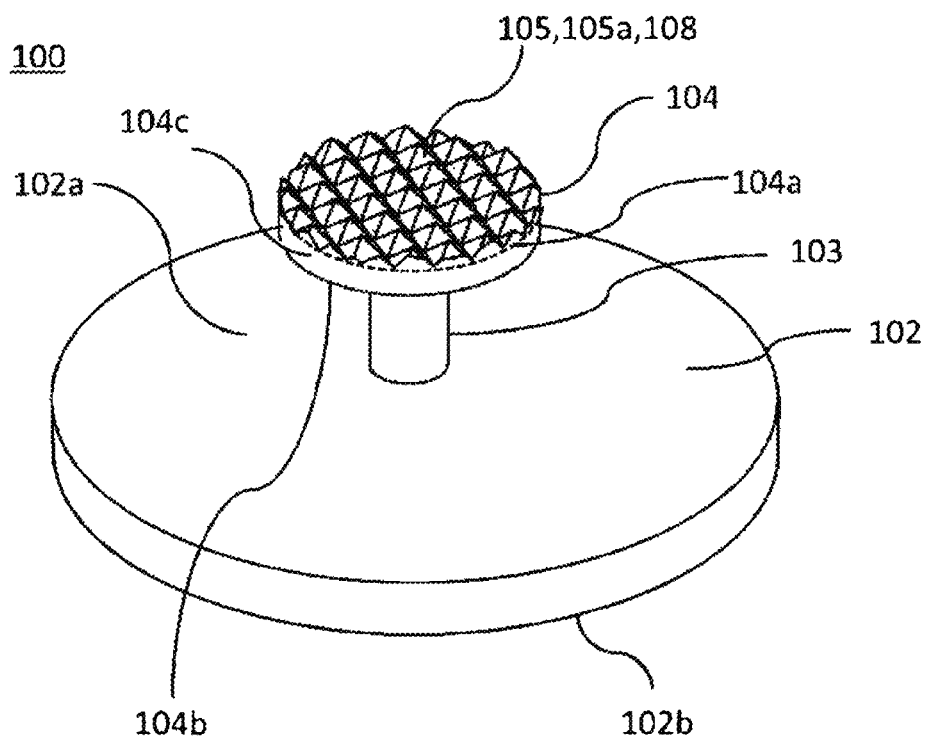
FIG. 18 is a schematic perspective view of the inspection window used in the first embodiment.

In the present embodiment, although the inspection window 100 includes the attachment portion 101, the window portion 102, the post 103, and the reflective plate 104, the configuration of the inspection window is not limited thereto. As shown in FIG. 18, the inspection window 100 may have a configuration that includes the window portion 102, the post 103 and the reflective plate 104 and does not include the attachment portion 101.

Figure 19:
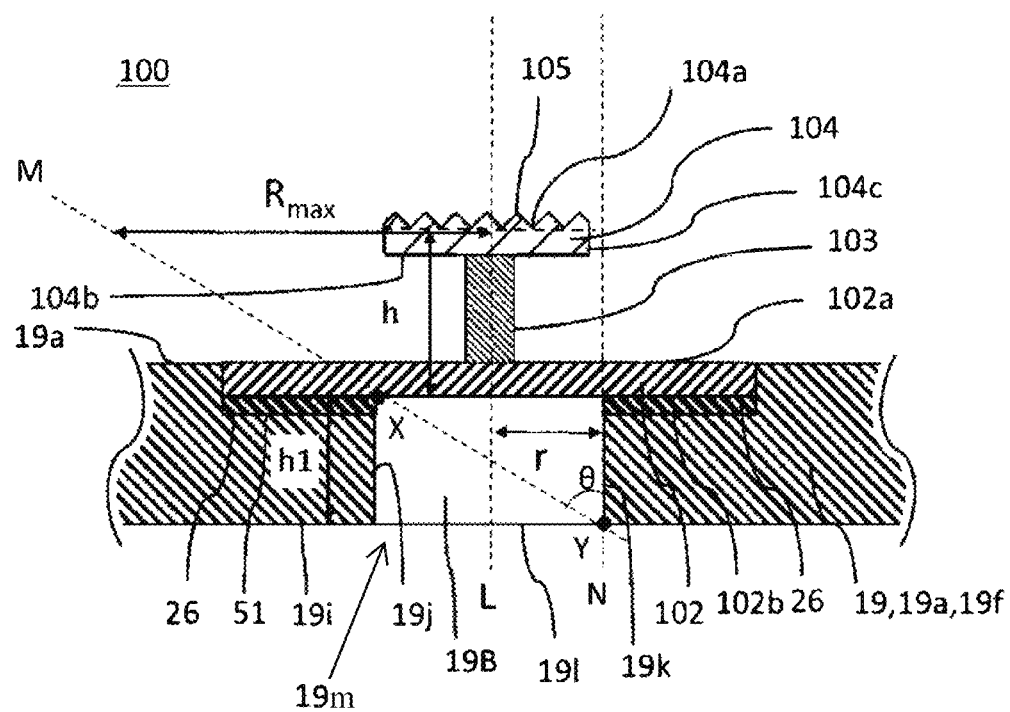
FIG. 19 is a schematic vertical cross-sectional view of the surroundings of the inspection window of the drain pan used in the first embodiment viewed from the straight line B-B'.

A configuration of such an inspection window 100 attached to the water storage portion 19f of the drain pan 19 is shown in FIG. 19. FIG. 19 is a diagram showing the inspection window 100 shown in FIG. 18 that is fixed to the drain pan 19 through a sealant 26, and showing cross-sections of the drain pan 19 and the inspection window 100 in the same direction as that of the cross-sectional line B-B' of FIG. 6. In FIG. 19, a configuration of surroundings of the drain 24 is omitted. When the inspection window 100 shown in FIG. 18 is attached to the water storage portion 19f of the drain pan 19, the attachment surface 51 formed to be a step lower than the bottom surface 19h is formed in the bottom surface 19h of the drain pan 19f, and a cylindrical through hole 19j is formed in the attachment surface 51. Then, the sealant 26 is provided on the attachment surface 51, the window portion 102 is pressure joined to the attachment surface 51 from above the attachment surface 51, and thereby the inspection window 100 is fixed to the attachment surface 51 through the sealant 26. The window portion top surface 102a has a height approximately equal to that of the top surface (the bottom surface 19h of the water storage portion 19f) of the water storage bottom portion 19a and is horizontal.

In such a configuration, by the inspector seeing the strength of the reflected light of the reflective surface 108 through the through hole 19j, the inspector can also grasp the adherence state of the foreign objects on the window portion top surface 102a, in other words, the adherence state of foreign objects on the water storage bottom portion 19a of the drain pan 19. For this reason, it is possible to determine whether or not it is time to clean the drain pan 19 without the need for the inspector to remove the drain pan 19 from the housing 12 and to confirm the inside of the drain pan 19.

FIG. 19 shows a cross-section that passes through a central axis L of the through hole 19j formed in the attachment surface 51 of the water storage portion 19f and that is parallel to the central axis L. In FIG. 19, an angle θ is an angle formed by a diagonal line M and a vertical line N, and the diagonal line M is a line from a point x that is a point where an extension line of a first side surface 19k of the through hole 19j intersects with the window portion lower surface 102b, to a point y where a second side surface 19l of the through hole 19j contacts an opening 19m of the through hole 19j formed on a lower surface 19i of the drain pan 19. The radius R of the reflective plate top surface 104a is R≤(h1+h2)tan θ−r, where a height from the lower surface 19i of the drain pan 19 to the window portion lower surface 102b is h1, an up down width from the window portion lower surface 102b to the reflective plate top surface 104a is h2, and the radius of the through hole 19j is r. Rmax in FIG. 19 shows the maximum width of the R determined above. By setting the radius R of the reflective plate top surface 104a in this way, it is possible to have room light taken in from the through hole 19j be efficiently reflected, while limiting material costs.

In the inspection window 100 shown in the first embodiment, the attachment portion 101, the window portion 102, the post 103, and the reflective plate 104 are formed continuously and integrally by resin molding. The reflective plate 104 includes the reflective structure 105 in the second surface opposite to the first surface connected to the post 103, where the reflective structure 105 is made to reflect light transmitted through the window portion. Therefore, even in a case where the area of the inspection window of the drain pan is restricted, it is possible to insure visibility of the foreign objects on the window portion attached to the through hole of the inspection window 100, while limiting the number of parts of the inspection window 100.

In the present embodiment, the inspection window 100 is molded using injection molding, with transparent resins such as polymethyl methacrylate, polyethylene terephthalate, polycarbonate, epoxy, and polyarylate as materials.

In a case where the window portion and the reflective plate are attached to the drain pan as separate parts, for example, in a case where a side surface of an intake portion of a drain pump is used as the reflective plate, the drain pump has to be disposed right above or in the vicinity of the window portion. Since the inspection window 100 of the first embodiment has the attachment portion 101, the window portion 102, the post 103, and the reflective plate 104 that are formed continuously and integrally by resin molding, the drain pump does not have to be disposed right above or in the vicinity of the widow portion so as to be used as the reflective plate.

Second Embodiment

An inspection window 200 of a second embodiment of the present disclosure is described using FIGS. 20, 21, 22, 23, 24 and 25. The inspection window 200 of the second embodiment includes two posts, that is, a first post 201 and a second post 202 in place of the post 103 of the first embodiment. The other components are similar to those of the first embodiment, so descriptions thereof are omitted. The same reference symbols in FIGS. 20, 21, 22, 23, 24 and 25 as the reference symbols used in the first embodiment denote equal parts.

Figure 20:
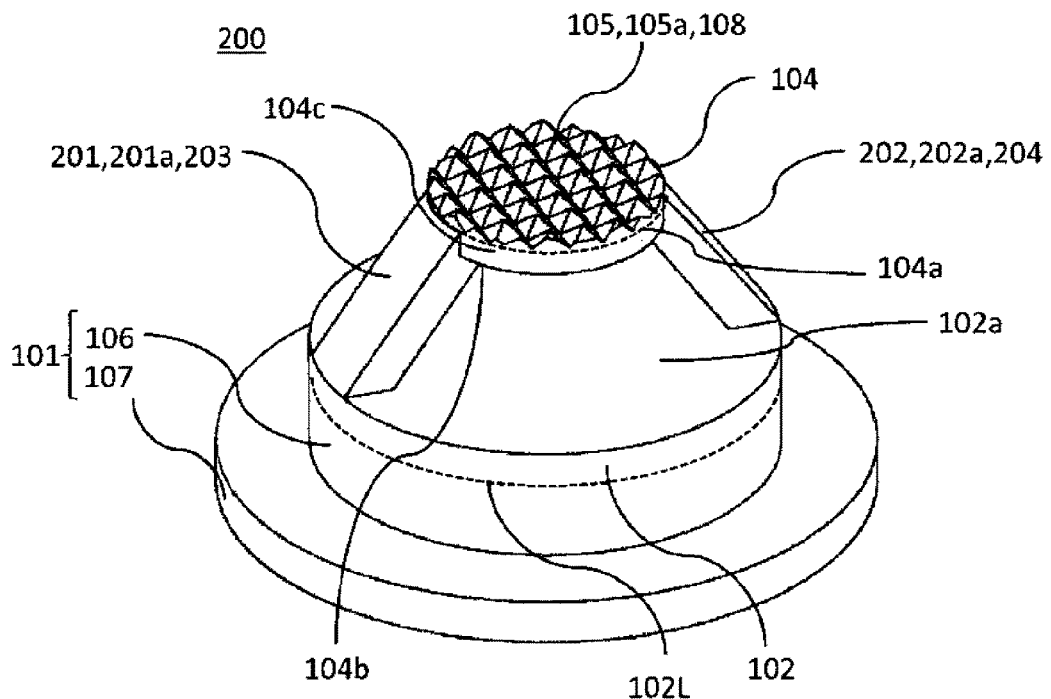
FIG. 20 is a schematic perspective view of an inspection window used in a second embodiment.
Figure 21:
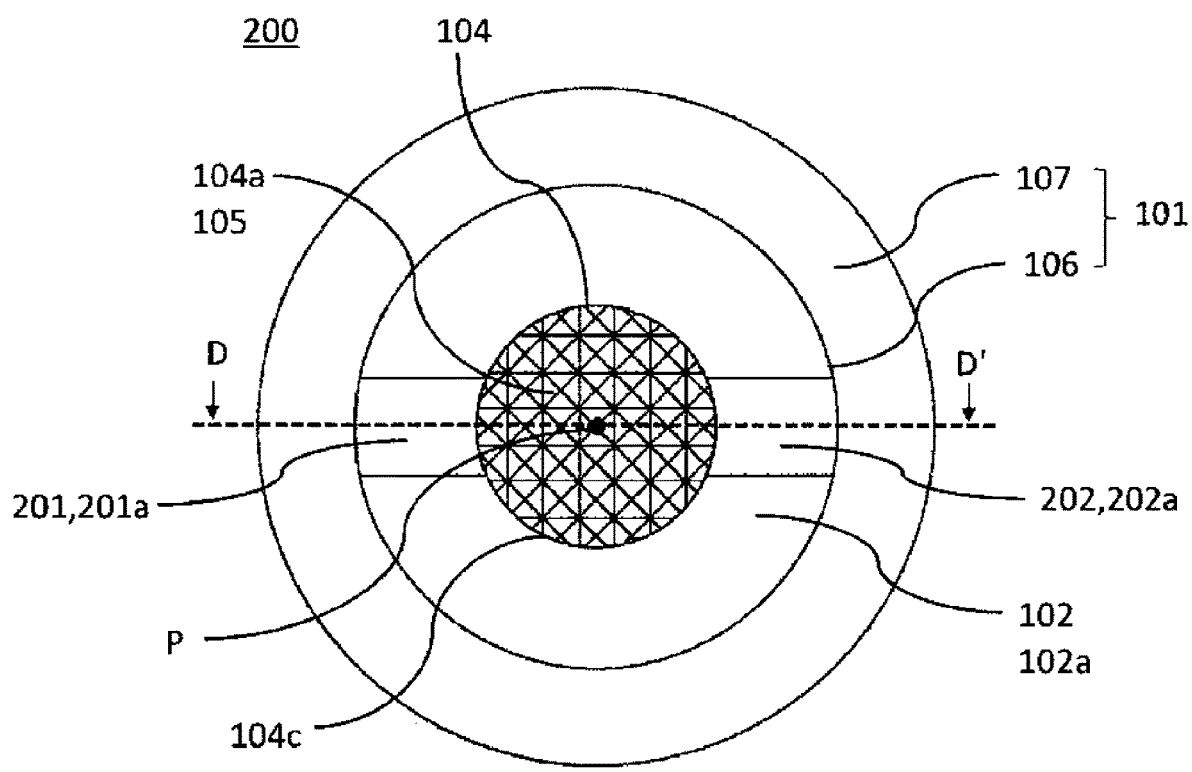
FIG. 21 is a schematic top view of the inspection window used in the second embodiment.
Figure 22:
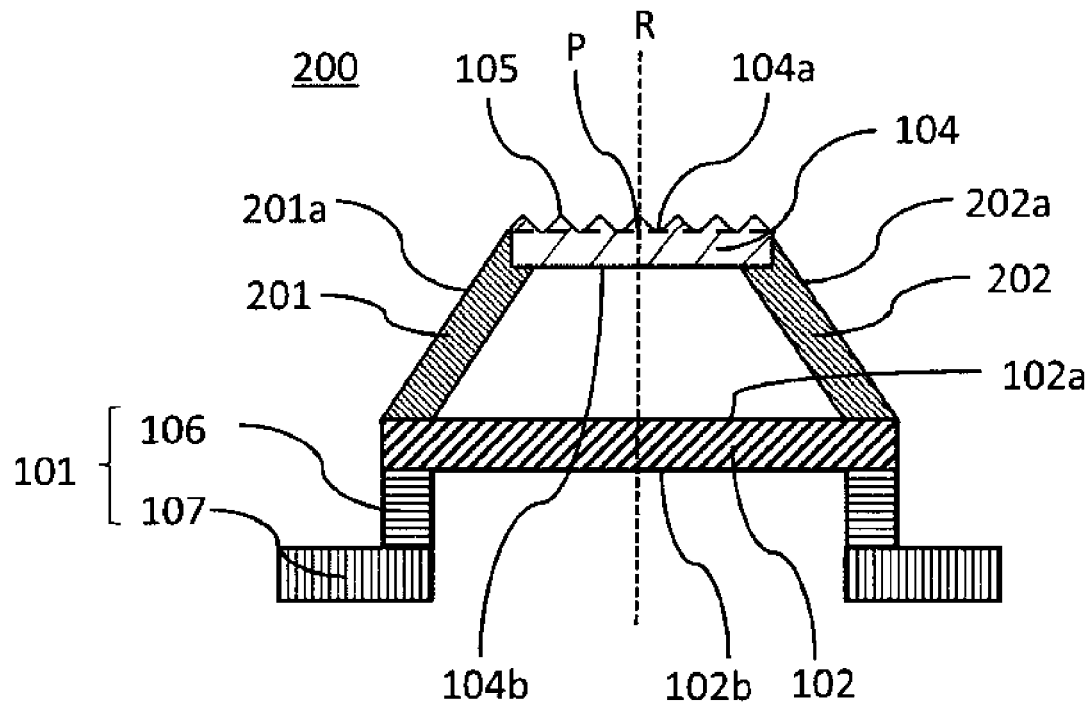
FIG. 22 is a schematic vertical cross-sectional view of the inspection window used in the second embodiment viewed from a straight line D-D'.

FIG. 20 is a schematic perspective view of the inspection window 200, and FIG. 21 is a schematic top view of the inspection window 200. FIG. 22 is a schematic cross-sectional view of the inspection window 200, and shows a cross-section of the inspection window 200 viewed from a cross-sectional line D-D' passing through the center P of the reflective plate top surface 104a, the first post 201 and the second post 202.

The first post 201 that is a first support portion is between the window portion 102 and the reflective plate 104, one end of two ends of the first post 201 is connected to the window portion top surface 102a, and the other end of the two ends of the first post 201 is connected to the reflective plate lower surface 104b and the reflective plate side surface 104c. Similarly, the second post 202 that is a second support portion is between the window portion 102 and the reflective plate 104, one end of two ends of the second post 202 is connected to the window portion top surface 102a, and the other end of the two ends of the second post 202 is connected to the reflective plate lower surface 104b and the reflective plate side surface 104c. The first post 201 and the second post 202 are provided along an edge portion of the window portion 102. The second post 202 is in a symmetrical position to the first post 201 with respect to a straight line R that passes through the center of the window portion top surface 102a and the center P of the reflective plate top surface 104a.

When the inspection window 200 is viewed from the top, the area of the reflective plate 104 is smaller than that of the window portion 102, and the reflective plate 104 is inside the window portion 102. Therefore, in a cross-sectional view of the inspection window 200 at the cross-sectional line D-D' that passes through the first post 201 and the second post 202, the first post 201 and the second post 202 are inclined with respect to the window portion top surface 102a and the reflective plate lower surface 104b. In other words, the first post 201 and the second post 202 are inclined at acute angles with respect to a surface (the window portion top surface 102a) of the window portion 102 in which the first post 201 and the second post 202 are provided. The first post 201 is formed of four surfaces, and a surface (a top surface 201a) thereof that is visible when the inspection window 200 is viewed from the top is provided with a second reflective structure 203. Similarly, the second post 202 is formed of four surfaces, and a surface (a top surface 202a) thereof that is visible when the inspection window 200 is viewed from the top is provided with a third reflective structure 204. In other words, in the inspection window 200, a first reflective structure 105 is provided in the reflective plate top surface 104a, the second reflective structure 203 is provided in the top surface 201a of the first post 201, and the third reflective structure 204 is provided in the top surface 202a of the second post 202.

Figure 26:
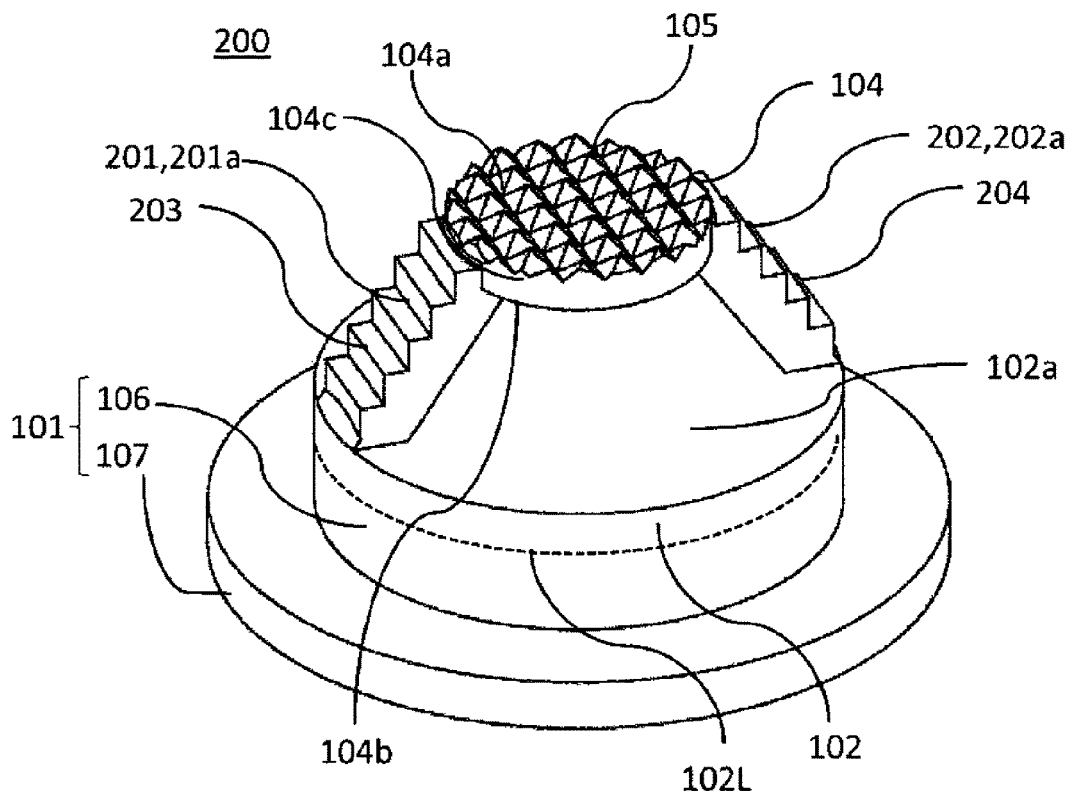
FIG. 26 is a schematic perspective view of the inspection window used in the second embodiment.

The second reflective structure 203 and the third reflective structure 204 are appropriately selected from shapes to enable the inspection window 200 to be integrally formed from resin. As an example, as shown in FIG. 26, as the second reflective structure 203, at least one apex structure is formed in the top surface 201a of the first post 201, the apex structure is formed of two surfaces, has an apex shaped as a straight line, and protrudes upwards with respect to the top surface 201a on a vertical cross-section that intersects with the straight line.
Similarly, as the third reflective structure 204, at least one apex structure is formed in the top surface 202a of the second post 202, the apex structure is formed of two surfaces, has an apex shaped as a straight line, and protrudes upwards with respect to the top surface 202a on a vertical cross-section that intersects with the straight line.

The inspection window 200 shown in the second embodiment has the second reflective structure 203 and the third reflective structure 204 that are provided on the top surface 201a of the first post 201 and the top surface 202a of the second post 202, respectively, in addition to the first reflective structure 105 formed on the reflective plate top surface 104a. By such a configuration, in the inspection window 200, it is possible to reflect part of light that has passed from the room through the through hole 19b (not shown) of the drain pan 19 (not shown) by the second reflective structure 203 and the third reflective structure 204 in addition to the first reflective structure 105, and to have the part of light pass through the window portion 102 and the through hole 19b and be transmitted to the outside of the indoor unit 1. For this reason, it is possible to increase the ability to reflect light of the inspection window 200 compared to the inspection window 100 of the first embodiment.

Figure 23:
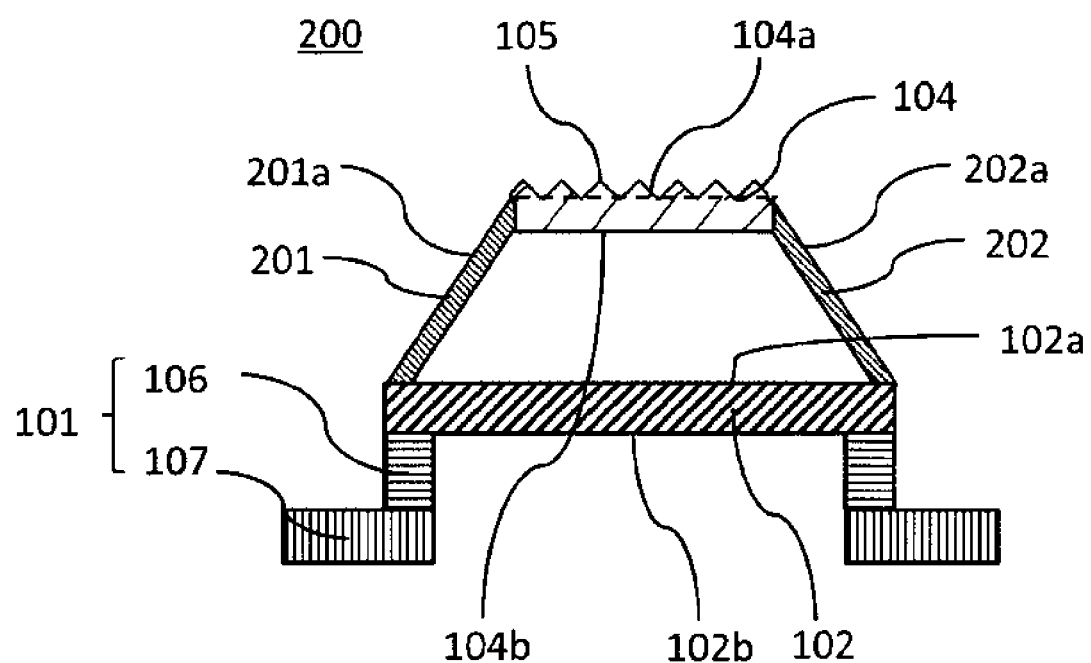
FIG. 23 is a schematic vertical cross-sectional view of the inspection window used in the second embodiment taken along the straight line D-D'.
Figure 24:
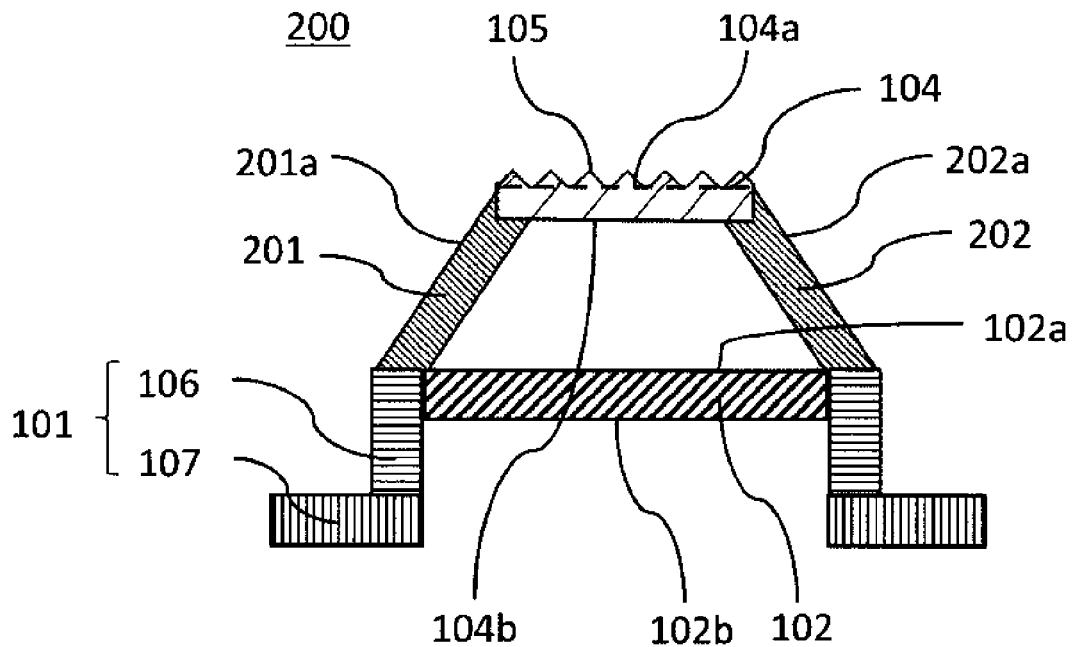
FIG. 24 is a schematic vertical cross-sectional view of the inspection window used in the second embodiment viewed from the straight line D-D'.
Figure 25:
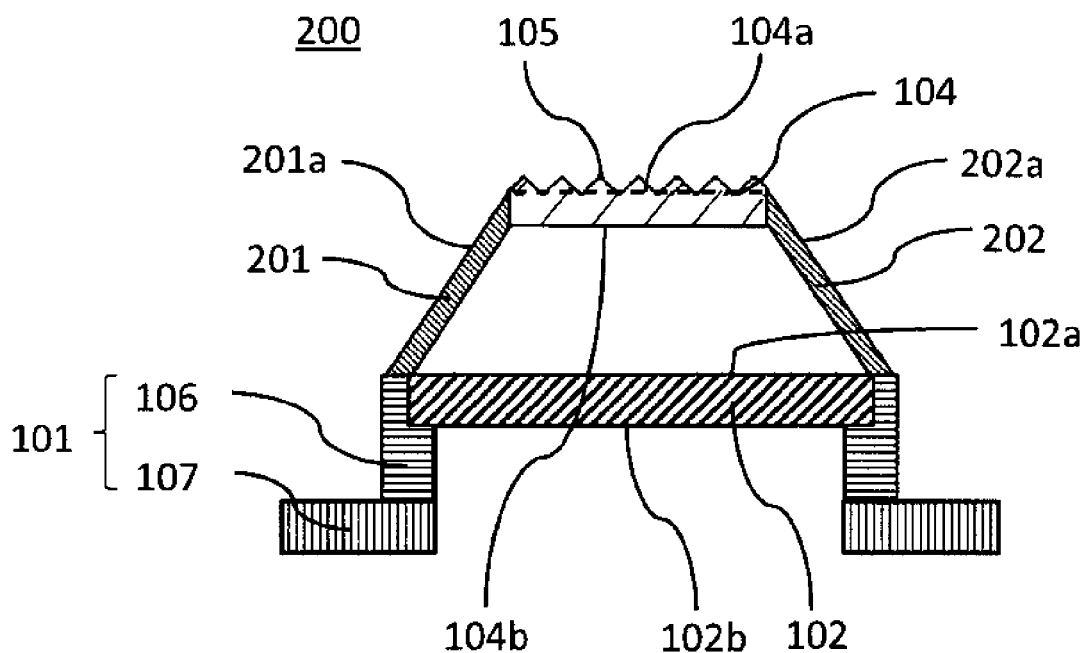
FIG. 25 is a schematic vertical cross-sectional view of the inspection window used in the second embodiment viewed from the straight line D-D'.

Although the inspection window 200 of the second embodiment, as shown in FIG. 22, has one end of two ends of the first post 201 connected to the window portion top surface 102a, and the other end of the two ends of the first post 201 connected to the reflective plate lower surface 104b and the reflective plate side surface 104c, the configuration of the inspection window 200 is not limited thereto. As shown in FIG. 23, a configuration where the other end of the two ends of the first post 201 is not connected to the reflective plate lower surface 104b but is connected to the reflective plate side surface 104c is possible. As shown in FIG. 24, a configuration where the one end of the two ends of the first post 201 is not connected to the window portion top surface 102a but is connected to the second attachment portion 106 is possible. As shown in FIG. 25, a configuration where the one end of the two ends of the first post 201 is not connected to the window portion top surface 102a but is connected to the second attachment portion 106, and the other end of the two ends of the first post 201 is not connected to the reflective plate lower surface 104b but is connected to the reflective plate side surface 104c is possible. Even in such configurations, it is possible to increase the ability to reflect light of the inspection window 200 compared to the inspection window 100 of the first embodiment.

In the second embodiment, although a case where reflective structures are provided on both of the top surface 201a of the first post 201 and the top surface 202a of the second post 202 of the inspection window 200 is described, the configuration of the inspection window 200 is not limited thereto. A reflective structure (the second reflective structure 203 or the third reflective structure 204) may be provided on either one of the top surface 201a of the first post 201 or the top surface 202a of the second post 202. Even in such a configuration, it is possible to increase the ability to reflect light of the inspection window 200 compared to the inspection window 100 of the first embodiment.

Third Embodiment

Figure 27:
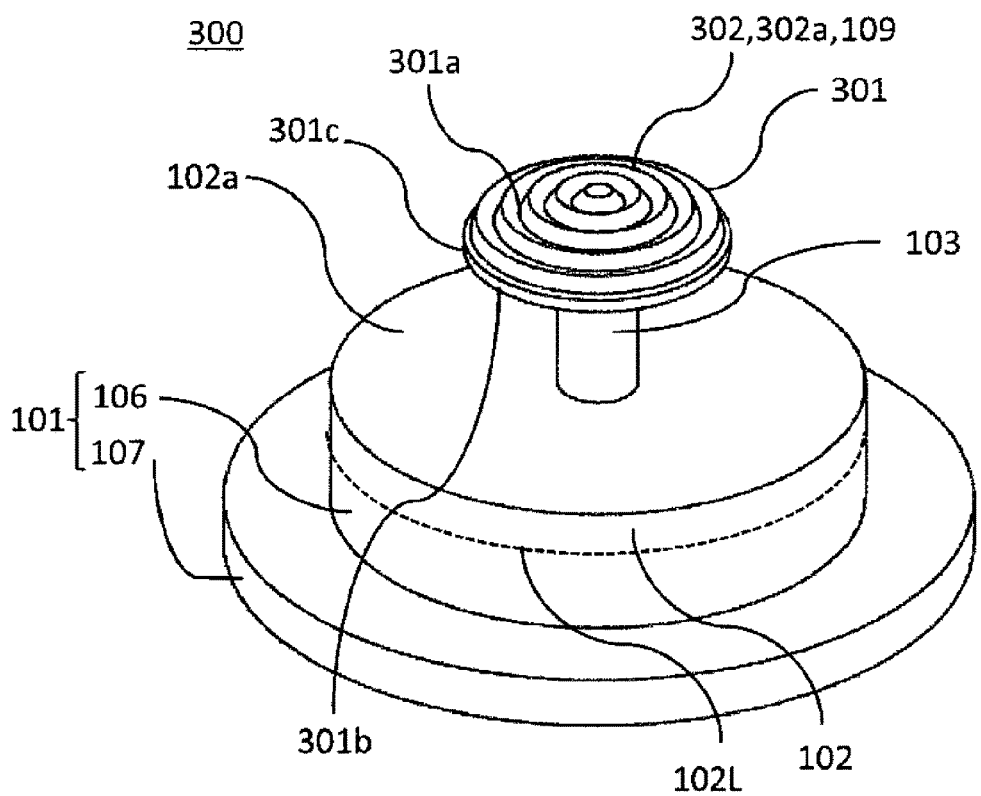
FIG. 27 is a schematic perspective view of an inspection window used in a third embodiment.
Figure 28:
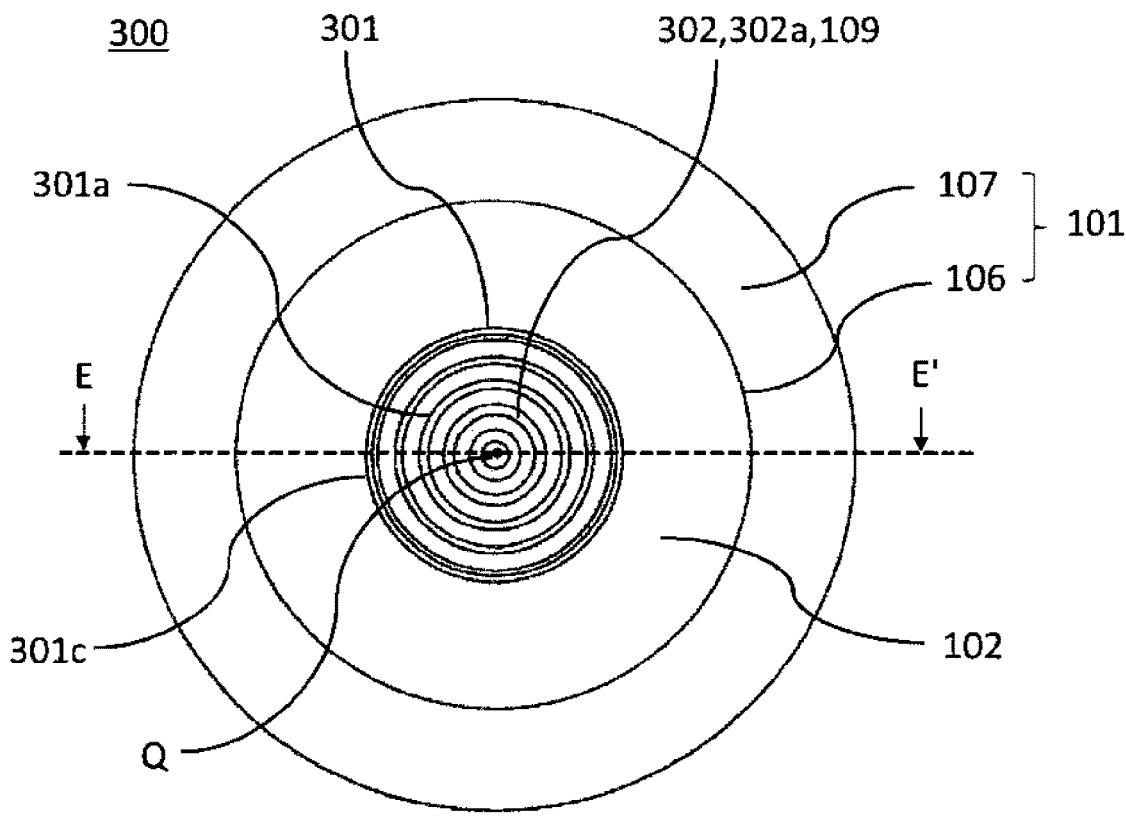
FIG. 28 is a schematic top view of the inspection window used in the third embodiment.
Figure 29:
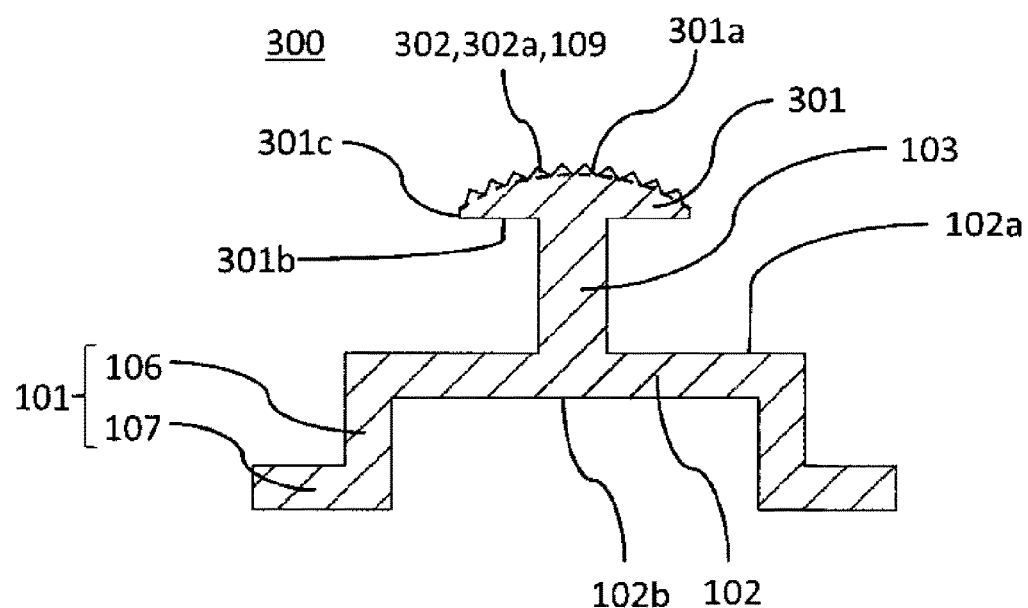
FIG. 29 is a schematic vertical cross-sectional view of the inspection window used in the third embodiment viewed from a straight line E-E'.

An inspection window 300 of a third embodiment is described using FIGS. 27, 28 and 29. The inspection window 300 of the third embodiment includes a reflective plate 301 that has a reflective plate top surface 301a that protrudes upwards in place of the reflective plate 104 of the first embodiment. The other components are similar to those of the first configuration, so descriptions thereof are omitted. The same reference symbols in FIGS. 27, 28 and 29 as the reference symbols used in the first embodiment denote equal parts.

FIG. 27 is a schematic perspective view of the inspection window 300, and FIG. 28 is a schematic top view of the inspection window 300. The reflective plate 301 of the inspection window 300 is round when viewed from the top. FIG. 29 is a schematic cross-sectional view of the inspection window 300, and shows a vertical cross-section of the inspection window 300 viewed from a straight line E-E' of FIG. 28. The straight line E-E' is a straight line that passes through the center Q of the reflective plate top surface 301a shown in FIG. 28.

The reflective plate 301 includes the reflective plate top surface 301a having a curved surface that is convex upwards shown by a dashed line in FIG. 29, and a reflective structure 302 provided on the reflective plate top surface 301a.

A reflective surface 109 is formed of the reflective structure 302 and a surface of the reflective plate top surface 301a not covered with the reflective structure 302 so as to reflect at least part of light that has passed through the through hole 19b. The reflective surface 109 is formed of the reflective structure 302 in a case where the entire reflective plate top surface 301a is covered by the reflective structure 302.

In the inspection window 300, as the reflective structure 302, at least one apex portion 302a of an apex cross-section (inverse V shape), which protrudes upwards, is provided on a circular line concentric with the center of the reflective plate top surface 301a, and is adjacent another, is formed in the reflective plate top surface 301a. In other words, as the reflective structure 302, the inspection window 300 has at least one apex portion 302a that protrudes upward on the reflective plate top surface 301a.

In the inspection window 300 of the third embodiment, since the reflective plate top surface 301a forms a curved surface so as to be convex upwards, the surface area of the reflective plate top surface 301a is large, compared to a case where the reflective plate top surface 301a is a level surface, so the region where a reflective structure can be disposed is large. Therefore, it is possible to further increase the ability to reflect light by providing the reflective structure 302 on the reflective plate top surface 301a, compared to a case where a reflective structure is provided on a level surface reflective plate top surface 301a. For this reason, it is possible to increase the ability to reflect light of the inspection window 300 compared to the inspection window 100 of the first embodiment.

The reflective structure 302 of the third embodiment is not limited to the above configuration. As the reflective structure 302, at least one quadrangular pyramid that protrudes upwards may be formed in the reflective plate top surface 301a, and the quadrangular pyramid is formed of flat surfaces that intersect at a right angle at the apex. As the reflective structure 302, a portion of at least one sphere that protrudes upwards may be formed in the reflective plate top surface 301a. As the reflective structure 302, at least one cone that protrudes upwards may be formed in the reflective plate top surface 301a. As the reflective structure 302, a structure having at least one apex portion of an apex cross-section (inverse V shape) that protrudes upwards on a vertical cross-section that intersects with a curved line, where the apex portion has an apex shaped as the curved line, may be formed in the reflective plate top surface 301a. In such configurations, it is possible to increase the ability to reflect light of the inspection window 300 compared to the inspection window 100 that includes the reflective structure 105 having a similar shape to that of the first embodiment.

Fourth Embodiment

Figure 30:
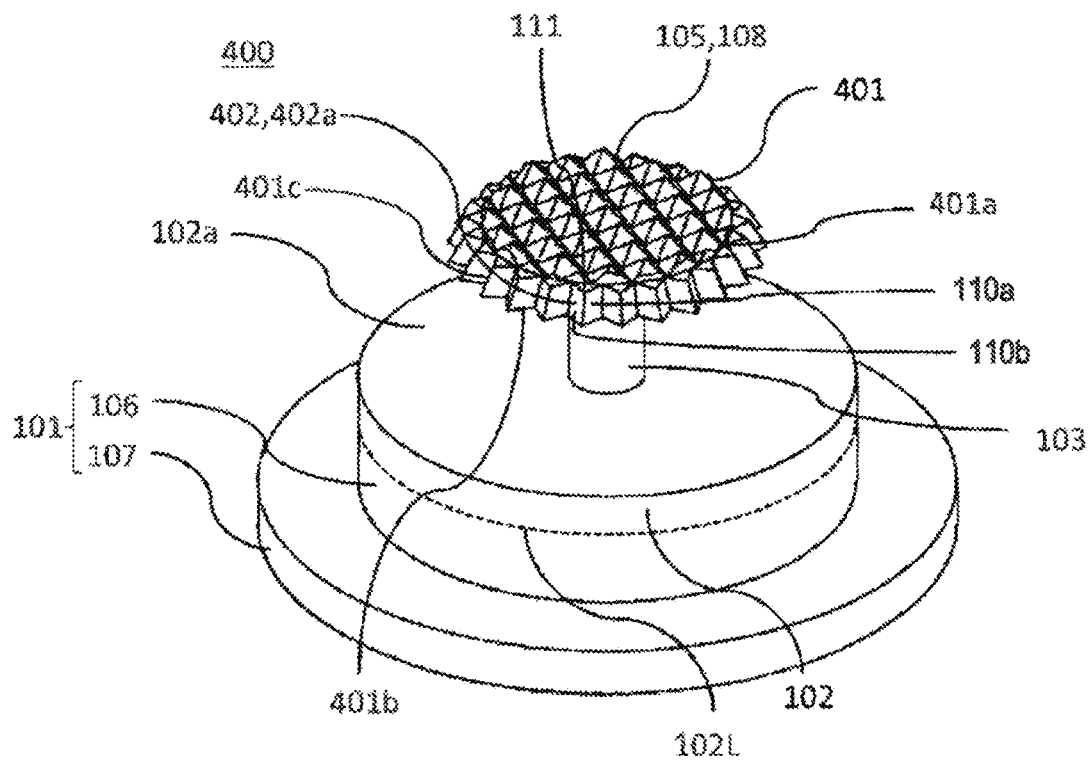
FIG. 30 is a schematic perspective view of an inspection window used in a fourth embodiment.

An inspection window 400 of a fourth embodiment is described using FIG. 30. The inspection window 400 of the fourth embodiment differs from the first embodiment in that a reflective plate 401 that includes a reflective structure 402 on a reflective plate side surface 401c is included, in replace of the reflective plate 104 of the first embodiment. The other components are similar to those of the first embodiment, so descriptions thereof are omitted.

FIG. 30 is a perspective view of the inspection window 400 of the fourth embodiment. In FIG. 30, the reflective plate side surface 401c of the reflective plate 401 is inclined so as to form an angle less than or equal to 90 degrees with a reflective plate lower surface 401b, and the reflective plate 401 has the reflective plate lower surface 401b having an area greater than that of a reflective plate top surface 401a. In other words, the reflective plate 401 has a shape of a truncated cone, the reflective plate top surface 401a constitutes the top surface of the truncated cone, the reflective plate lower surface 401b constitutes the lower surface of the truncated cone, and the reflective plate side surface 401c constitutes the side surface of the truncated cone. As shown in FIG. 30, the reflective structure 402 is formed in the reflective plate side surface 401c of the inspection window 400.

As shown in FIG. 30, as the reflective structure 402, at least one structure 402a, which is formed of a first surface 110b, a second surface 110a, a top surface 111 of a triangle, and a lower surface 112 (not shown) of a triangle, and has an apex shaped as a straight line, is formed in the reflective plate side surface 401c of the reflective plate 401 along the side surface 401c. The structure 402a includes an apex shape that protrudes outwards from the reflective plate side surface 401c on a cross-section in a horizontal direction of the reflective plate 401.

In the inspection window 400 of the fourth embodiment, as the reflective structure 402, at least one structure 402a is formed in the reflective plate side surface 401c of the reflective plate 401. Therefore, in a case where the same reflective structure as that of the first embodiment is formed in the reflective plate top surface 401a, since the reflective plate 401 has a reflective structure that is provided in the reflective plate side surface 401c as opposed to the reflective plate 104 of the first embodiment, it is possible to increase the ability to reflect light of the inspection window 400 compared to the inspection window 100 of the first embodiment.

Figure 31:
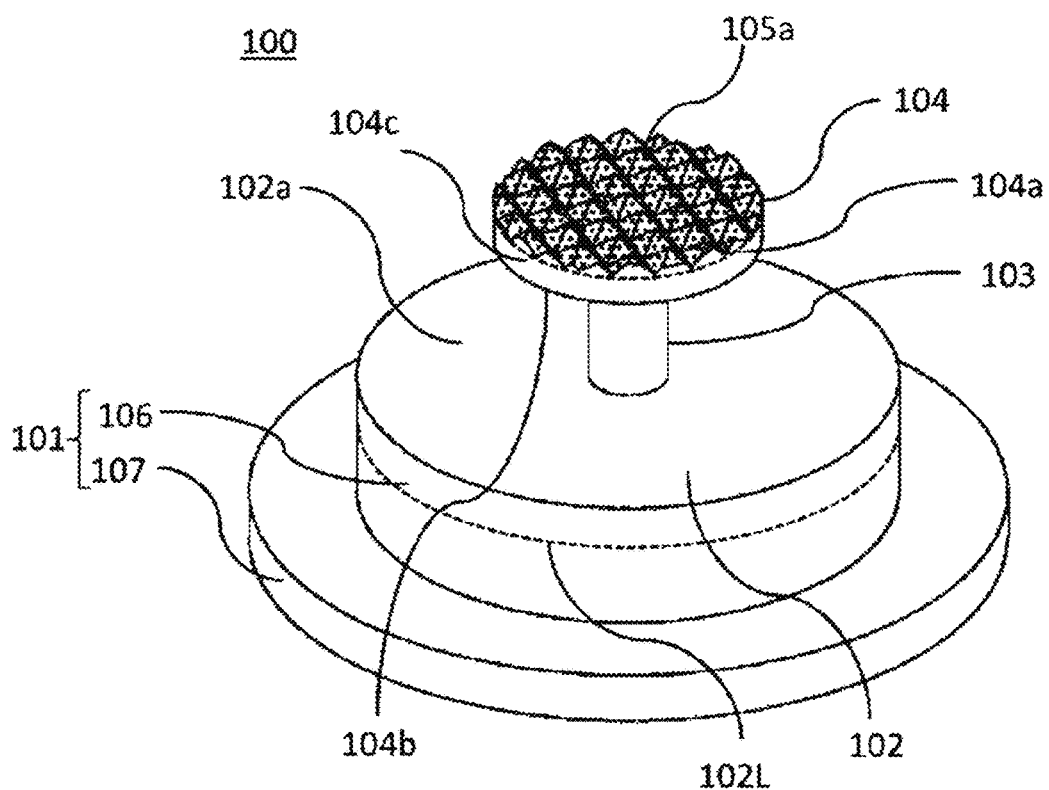
FIG. 31 is a schematic perspective view of the inspection window used in the first embodiment.

In each of the embodiments above, although a mold used for forming the reflective structure is mirror finished and the surface of the reflective structure is a planar surface (in the case the surface is a conical surface, a smooth conical surface, and in the case the surface is spherical, a smooth spherical surface) when injection molding the inspection window using the mold, the embodiments above are not limited thereto. In each of the embodiments above, when injection molding the inspection window using the mold, emboss processing is applied to the mold used for forming the reflective structure so that the surface of the mold is not mirror finished but has several tens to several hundred micrometers of fine bumps attached. By such a mold, a multitude of bumps are formed on the surface of the planar surface, the spherical surface, and the conical surface of the reflective structure. FIG. 31 is, as an example, a diagram showing a quadrangular pyramid 105a having emboss processing applied to the reflective structure 105 of the inspection window 100 in the first embodiment. As such, by applying emboss processing to the surface of the reflective structure 105 of the inspection window 100, light can be diffused off the surface of the quadrangular pyramid 105a, making it possible to illuminate the quadrangular pyramid 105a. From this, the visibility of the reflective structure increases.

Although the indoor unit 1 in each of the embodiments above is made to be a ceiling-mounted air conditioner, the indoor unit is not limited thereto. As long as an indoor unit includes a drain pan inside a housing and is configured such that an inspection window is attached to a through hole formed in a water storage portion of the drain pan, it is possible to apply each of the embodiments above to the indoor unit other than that of a ceiling-mounted type.

Although the shapes of the window portion 102 and the reflective plate 104 are circular plates in each of the embodiments above, the shapes are not limited thereto. In a case where the window portion 102 covers the opening of the through hole 19b or the through hole 19j, and the reflective plate 104 has an ability to reflect light transmitted through the window portion 102 to the outside of the drain pan 19 through the through hole 19b or the through hole 19j, it is possible to change the shapes of the window portion 102 and the reflective plate 104 to shapes other than circular shaped plates, such as square shaped plates for example. Similarly, the first post 201, the second post 202, the reflective plate 301, and the reflective plate 401 can be changed to other shapes as well. The first attachment portion 107 and the second attachment portion 106 are not limited to the shapes shown in each of the embodiments above, and may be assembled with other parts so as to block the through hole 19b.

The invention claimed is:

1. An inspection window, comprising:
a window attached to a water storage bottom portion provided in a drain pan inside a housing included in an air conditioner so as to be aligned with a through hole penetrating the water storage above the through hole, the water storage bottom portion accumulating drain water generated by an indoor heat exchanger under the indoor heat exchanger;
a first support provided on the window; and
a reflective portion supported by the first support portion above a top surface of the window,
wherein the reflective portion includes a first surface connected to the first support, and a second surface opposite to the first surface,
the reflective portion includes, in the second surface, a first reflective structure that reflects light transmitted through the window toward the through hole, and the first reflective structure is a spherical surface that protrudes upward from the second surface, and
the window, the first support, and the reflective portion are together integrally formed as a single body of light-transparent material.

2. The inspection window according to claim 1, comprising:
a first attachment portion surrounding the through hole and attached to an attachment surface of the water storage bottom portion, the attachment surface being formed a step lower than a bottom surface of the water storage bottom portion; and
a second attachment portion provided on a top of the first attachment portion and supporting the window to the drain pan such that a height of the top surface of the window matches a height of the bottom surface of the water storage bottom portion,
wherein the window, the first attachment portion, and the second attachment portion are integrally formed of light-transparent material.

3. The inspection window according to claim 1, wherein the second surface of the reflective portion is a flat surface.

4. The inspection window according to claim 1, wherein the second surface of the reflective portion is formed of a convex curved surface.

5. The inspection window according to claim 1,
wherein the window includes a second support supporting the reflective portion, and
wherein the first support and the second support both tilt with respect to the top surface of the window.

6. The inspection window according to claim 5, wherein a second reflective structure that reflects light transmitted through the window in a direction toward the window is formed on one surface of the first support, and
a third reflective structure that reflects light transmitted through the window in the direction toward the window portion is formed on one surface of the second support.

7. The inspection window according to claim 6, wherein at least one of the second reflective structure and the third reflective structure includes a structure having an apex formed by two surfaces, and the apex is shaped as a straight line.

8. The inspection window according to claim 1, wherein the reflective portion includes a side surface between the first surface and the second surface,
the second surface is smaller than the first surface,
an angle the side surface forms with the first surface is an acute angle, and
a fourth reflective structure is formed on the side surface.

9. The inspection window according to claim 8, wherein the fourth reflective structure includes a convex part having an apex formed by two surfaces, and the apex is shaped as a straight line.

10. The inspection window according to claim 1, wherein the window is larger than an opening of the through hole, and
the window is attached to the drain pan so as to close the through hole.

11. The inspection window according to claim 10, wherein a surface of the window on which the first support is provided is the top surface of the window.

12. The inspection window according to claim 1, wherein the reflective portion is adapted and disposed so as to be lower than a maximum water surface level of the drain water accumulated in the drain pan.

13. The inspection window according to claim 1, wherein the reflective portion is supported by the first support such that the first surface is parallel to the top surface of the window.

14. An air conditioner, comprising:
a housing;
an indoor heat exchanger provided inside the housing;
a drain pan including a water storage bottom portion, the water storage being provided below the indoor heat exchanger inside the housing and receiving drain water generated by the indoor heat exchanger;
an inspection window attached to the water storage bottom portion; and
a decorative panel attached on a bottom end of the housing so as to cover the drain pan,
wherein the inspection window includes
a window that is above a through hole penetrating the water storage bottom portion and that covers the through hole,
a first support provided on a top surface of the window, and
a reflective portion supported by the first support above the window portion,
the reflective portion includes, in a top surface of the reflective portion, a reflective structure that reflects light transmitted through the window toward the through hole, the reflective structure being a spherical surface that protrudes upward from the top surface of the reflective portion,
the window, the first support, and the reflective portion are together integrally formed as a single body of light-transparent material, an opening is formed on a portion of the decorative panel, the portion of the decorative panel being below the inspection window and facing the window, and the air conditioner is configured to allow confirmation, through the through hole from the opening, of a foreign object of the top surface of the window that is generated by the drain water.

15. The air conditioner according to claim 14, wherein the drain pan includes, in the water storage bottom portion, an attachment surface that is lower than a bottom surface of the water storage bottom portion, the inspection window further includes
  a first attachment portion attached to the attachment surface, and
  a second attachment portion provided on the first attachment portion and supporting the window with respect to the first attachment portion, and the window, the first support, the reflective portion, the first attachment portion, and the second attachment portion are together integrally formed as the single body of light-transparent material.

16. The air conditioner according to claim 15, wherein a height of the top surface of the window matches a height of the bottom surface of the water storage bottom portion.

17. The air conditioner according to claim 14, wherein the top surface of the reflective portion is adapted and disposed so as to be lower than or equal to a maximum water surface level of the drain water accumulated in the drain pan.

18. The air conditioner according to claim 14, wherein the reflective portion is supported by the first support such that a lower surface of the reflective portion is parallel to the top surface of the window.

\* \* \* \* \*